US006165400A

United States Patent [19]

Hinzmann

[11] Patent Number: 6,165,400

[45] Date of Patent: Dec. 26, 2000

[54] COMPACTED-POWDER OPPOSED TWIN-HELICAL GEARS AND METHOD

[75] Inventor: Ing Gerd Hinzmann, Oakville, Canada

[73] Assignee: Stackpole Limited, Mississauga, Canada

[21] Appl. No.: 08/647,057

[22] Filed: May 9, 1996

[51] Int. Cl.[7] .................................................... B29C 43/42

[52] U.S. Cl. .......................... 264/120; 264/294; 264/318; 264/325; 425/353; 425/354; 425/355; 419/66

[58] Field of Search ................................ 419/66; 425/78, 425/354, 344, 346, 347, 348 S, 352, 353, 355, 443, 356, DIG. 58; 264/109, 120, 294, 325, 318

[56] References Cited

U.S. PATENT DOCUMENTS

| | | | |
|---|---|---|---|
| 2,561,735 | 7/1951 | Haller | 78/5 |
| 3,020,589 | 2/1962 | Maritano | 18/16.5 |
| 3,394,432 | 7/1968 | Laurent | 18/16 |
| 3,694,127 | 9/1972 | Takahashi et al. . | |
| 3,752,622 | 8/1973 | Viadana | 425/78 |
| 3,773,446 | 11/1973 | Borrini | 425/78 |
| 3,842,646 | 10/1974 | Kuhn . | |
| 3,891,367 | 6/1975 | Signora | 425/78 |
| 3,909,167 | 9/1975 | Signora | 425/78 |
| 4,008,021 | 2/1977 | Fedrigo et al. | 425/3 |
| 4,043,385 | 8/1977 | Petrenchik | 164/342 |
| 4,047,864 | 9/1977 | De Santis | 425/78 |
| 4,053,267 | 10/1977 | De Santis | 425/78 |
| 4,061,452 | 12/1977 | De Santis | 425/78 |
| 4,061,453 | 12/1977 | De Santis | 425/78 |
| 4,087,221 | 5/1978 | Munson et al. | 425/78 |
| 4,153,399 | 5/1979 | De Santis | 425/78 |
| 4,270,890 | 6/1981 | Ottl | 425/150 |
| 4,401,614 | 8/1983 | De Santis | 264/109 |
| 4,482,307 | 11/1984 | Schaidl et al. | 425/78 |
| 4,573,895 | 3/1986 | De Santis | 425/78 |
| 4,666,389 | 5/1987 | Relis et al. | 425/78 |
| 4,853,180 | 8/1989 | Howard | 419/66 |
| 4,923,382 | 5/1990 | Klein | 425/78 |
| 5,024,811 | 6/1991 | Hinzmann et al. | 419/66 |
| 5,043,111 | 8/1991 | Hinzmann et al. | 264/40.5 |
| 5,043,123 | 8/1991 | Gormanns et al. | 264/113 |
| 5,049,054 | 9/1991 | Schaidl et al. | 425/78 |

(List continued on next page.)

FOREIGN PATENT DOCUMENTS

| | | |
|---|---|---|
| WO 95/14567 | 1/1995 | WIPO . |
| WO 95/14568 | 1/1995 | WIPO . |

OTHER PUBLICATIONS

SAE Technical Paper Series 960278, Nagata and Sugimoto, Feb. 26–29, 1996 "The Development of P/M Complicated Shape Helical Gears".

*Primary Examiner*—Jan H. Silbaugh
*Assistant Examiner*—Kenneth M. Jones
*Attorney, Agent, or Firm*—Orange & Chari

[57] ABSTRACT

A multiply-acting powder metal press is disclosed for making green form double helical gear compacts. The press has inner and outer lower punches, and an upper, outer punch. The upper and lower outer punches have left hand and right hand external helical profiles as chosen to produce a desired helical gear. The punches co-operate with left hand and right hand helical dies carried by the press about the punches. The helical faces require that the dies rotate relative to the punches during operation. A cam and roller mechanism may drive this rotation. The compact forming process commences with an open position in which powder is introduced to a vacant lower die cavity. The upper portions of the press advance downward to close the cavity. All parts of the press except the lower inner, or transfer, punch then move downward at the same speed to transfer powder to the extremities of the cavity. When transfer is complete both lower punches may be stopped, while the upper punches continue to advance. The dies advance at half the speed of the upper punches, rotating partially as they do so. Once the powder reaches its compacted density the upper and lower punches cease motion, but they dies continue to turn, separating themselves and compressed part. Finally the part is ejected and the press returns to the initial condition.

31 Claims, 15 Drawing Sheets

U.S. PATENT DOCUMENTS

| | | | |
|---|---|---|---|
| 5,156,854 | 10/1992 | Yamada | 425/78 |
| 5,238,375 | 8/1993 | Hirai | 425/77 |
| 5,259,744 | 11/1993 | Take . | |
| 5,326,242 | 7/1994 | Katagiri et al. | 425/78 |
| 5,366,363 | 11/1994 | Good et al. | 425/78 |
| 5,401,153 | 3/1995 | Katagiri et al. | 425/78 |
| 5,478,225 | 12/1995 | Takeuchi et al. | 425/78 |
| 5,498,147 | 3/1996 | Katagiri et al. | 425/78 |
| 5,698,149 | 12/1997 | Hinzmann et al. | 264/120 |

Sheet 1 of 3.

2
4
86
80
83
84
82
81

Sheet 2 of 3.
60
65
64b
64a
85
64c
66
63a
67
63b
62
68
75
70
61
79
93
71
69
76
72
56
56a
54
50
52
53
57
59
51
58
55
57
74
94
73

Sheet 3 of 3.

Sheet 1 of 2.

Sheet 2 of 2.

COMPACTED-POWDER OPPOSED TWIN-HELICAL GEARS AND METHOD

FIELD OF INVENTION

This invention relates to the field of compacting presses for powder materials, and in particular to such presses as are used to compact powder metal into the form of gears, helical gears, and most particularly to opposed double helical, or herringbone, gears.

BACKGROUND OF THE INVENTION

Powder compacting presses have been known for many years. They typically involve at least three interacting parts: a die, an upper punch and a lower punch. Initially the top punch is separated from the die and powder is introduced into a cavity formed within the die above the lower punch. Subsequent motion of the opposed punches reduces the internal cavity volume to compress the powdered metal to desired density. The resulting green formed part is removed from the cavity and sintered. For a part having sections of differing thickness additional movable top or bottom punches may be added to promote transfer of powder within the cavity.

The manufacture of gear teeth is more difficult when a helical gear is desired. Unlike a simple spur gear, as the die for a helical gear is closed it must also rotate relative to the punch, and then must achieve relative rotation in the opposite direction to release the compacted part. Where the helix angle is shallow, and the thickness of the gear is modest, an externally helically threaded punch is, or opposed punches are, brought into a mating, internally helically threaded die under the pressure of longitudinally acting rams. The die and one punch or both punches are carried in bearings and the force of the ram acting against the threads causes the tool elements (i.e. die and punch or both punches) to auto-rotate. Auto-rotating helical tool elements (i.e. die and punch or both punches) are known, as for example in U.S. Pat. No. 3,694,127 to Takahashi et al., and U.S. Pat. No. 5,259,744 to Take.

When the helix angle or the thickness of the gear increases, the frictional resistance in such dies may become large. To overcome this friction it is known to use motors to apply a torque to the tool elements, or to cause rotation of the tool elements at an appropriate speed, given the helix angle, as longitudinal rams force the tool elements together. It is also known that if one wishes to make parts having keyways or eccentric bores or internal splines there must be no relative rotation of the punch or core feature relative to the compacted powder, since such motion would shear off the keyway or bore.

Powder metal gears with offset, phased or undercut upper and lower portions have been produced. In these cases the finished parts can comprise at least two gear profiles formed in opposing dies which separate on a parting plane. In the case of helical gears it would be advantageous to be able to produce a gear having a helical profile to one side of the parting plane of the dies, and a different profile to the other side, whether an opposed helix, a helix of different pitch of the same hand, or out of phase helix, or a spur gear, whether of the same diameter or tooth height or not. A typical application of this kind of technology relates to the production of symmetrical opposed helical gears, most often referred to as herringbone gears.

It is advantageous to make herringbone gears from compacted and sintered powder metal since it is difficult and expensive to machine herringbone gears in the conventional manner. Conventional powder metallurgy may instead require back to back placement and juncture of two opposite-handed helical gears. This limits the size and delicacy of the metal herringbone gears that can be manufactured, and also their quality. If welded together such gears may not be true. If mechanically fastened such gears may be unnecessarily bulky.

To date the inventor is unaware of any powder metal presses for producing double opposed helical, or herringbone, gears. U.S. Pat. No. 3,694,127 to Takahashi et al. shows, at FIGS. 11 and 12, a powder metal compact and tooling for opposite handed helical threads. This apparatus cannot be used to produce herringbone gears, or even opposite handed gears in which the diameter of the gears is close, since, as noted in U.S. Pat. No. 5,259,744 to Take, the outer lower punch wall becomes too thin. Experience suggests that the minimum die wall thickness required to make a reliable tool is about 2 mm, which with allowance for the dedendum of the larger gear and the addendum of the smaller gear, would limit the parts which can be produced. The Takahashi device also relies on auto-rotation to move the upper punch, die, and lower outer punch all at once. Take can be used to make two helical gears of the same hand, but once again cannot make herringbone gears and is limited to producing helical gears that vary in diameter by at least the height of the teeth to be produced.

Thus there is a need for a device and method for compacting powder to form opposed twin helical gears that avoids thin walled punches. Further, there is a need for a device and method capable of compacting powder not only to form herringbone gears, but also to form opposed handed helical gears of even very small differences in diameter.

More generally, there is a need for a powder metal tool set that may be used to produce two-part helical gears, whether those two parts are of the same diameter or not.

SUMMARY OF THE INVENTION

The present invention concerns a multiply-acting powder compacting press and methods for operating that press to produce two part gears of a variety of types, in particular for producing powder metal symmetrically opposed helical, or herringbone, gears and two part helical gears whose diameters are substantially the same.

A powder metal multiply-acting press for the purposes of the present invention has a tool set having a core rod, an inner lower, or transfer, punch; an outer lower punch; a lower die; an upper die; and an upper punch. The upper portion (for example Sheet 2 of 2) may comprise an upper outer punch and an upper inner, or pre-lift, punch to aid lateral transfer of powder.

Depending on the type of gear to be produced the present invention pertains to tool sets in which either two or three elements rotate during the compaction and withdrawal steps of pressing a green powder metal compact.

In a first aspect of the invention there is a tool set for compacting a component from a powdered metal charge, that tool set comprising a pair of dies each having a respective chamber to define at least a portion of said component, a pair of punches each associated with a respective one of said dies and moveable relative thereto to vary the capacity of respective ones of those chambers; the dies being movable relative to one another between an open position in which said dies are separated and a closed position in which the dies co-operate to define a closed cavity; the punches being movable when the dies are in the closed position toward one another along an axis to compress the charge; the punches being maintainable in a fixed spaced relationship from each other to support the component during movement of the each of the dies from the closed position to a withdrawal position in which said component is exposed; one of the dies being rotatable about the axis relative to its respective punch during motion from the closed position to the withdrawal position.

In another aspect of the invention there is a tool set for forming a powder compact, that tool set comprising a pair of opposed die and punch sets each having a die and a punch co-operating therewith to define respective chambers; the dies being movable relative to one another from an open position in which the dies are separated, to a closed position in which the dies abut with the chambers in closed communication to form a closed mold cavity; the punches being movable in the closed position toward one another to compress said powder to form the compact; the dies being separable from the closed position by movement along the axis to expose the compact, said dies rotating conjointly as the compact is exposed.

In a further aspect of the invention there is a tool set for forming a powder compact, that tool set comprising a pair of opposed die and punch sets each having a die and a punch co-operating therewith to define respective chambers; the dies being movable relative to one another from an open position in which the dies are separated to permit a charge of powder to be received in one of said chambers, to a closed position in which the sets abut with said chambers in closed communication to form a closed mold cavity; one of the sets includes a punch movable in the closed position along an axis, to a transfer position in which the one chamber has a reduced volume and powder is transferred to the other of the chambers, the dies being separable from the closed position by relative movement along the axis with at least one of the dies rotating about the axis during movement along the axis to expose the compact.

In yet another aspect of the invention there is a method of forming a powder compact in a tool set having a pair of opposed die and punch sets each having a die and a punch co-operating therewith to define respective chambers, the method comprising the steps of: a) establishing the tool set in a closed position, with the chambers in closed communication to form a closed cavity containing a charge of powder; b) advancing the punches toward each other along an axis to compress the charge of powder and thereby to form the compact; and c) maintaining the punches at a fixed spacing from each other while moving each of the dies along the axis to expose the compact; d) rotating at least one of the dies about the axis as it moves along the axis; and e) ejecting the compact from the tool set.

Finally, in another aspect of the invention there is a method of forming a powder compact in a tool set having a pair of opposed die and punch sets each having a die and a punch co-operating therewith to define respective chambers, that method comprising the steps of: a) commencing with the die and punch sets separated; b) establishing one of the punches within its respective die in a filling position for receiving a charge of powder in its respective chamber; c) moving the dies to a closed position in which the chambers are closed communication to form a closed cavity containing the charge of powder; d) advancing the punches toward each other along an axis to compress the charge of powder and thereby to form the powder compact; e) separating the dies by moving each of the dies in opposite directions along the axis to expose the compact while rotating at least one of the dies about the axis; and f) ejecting the compact from the tool set.

Figure 1:
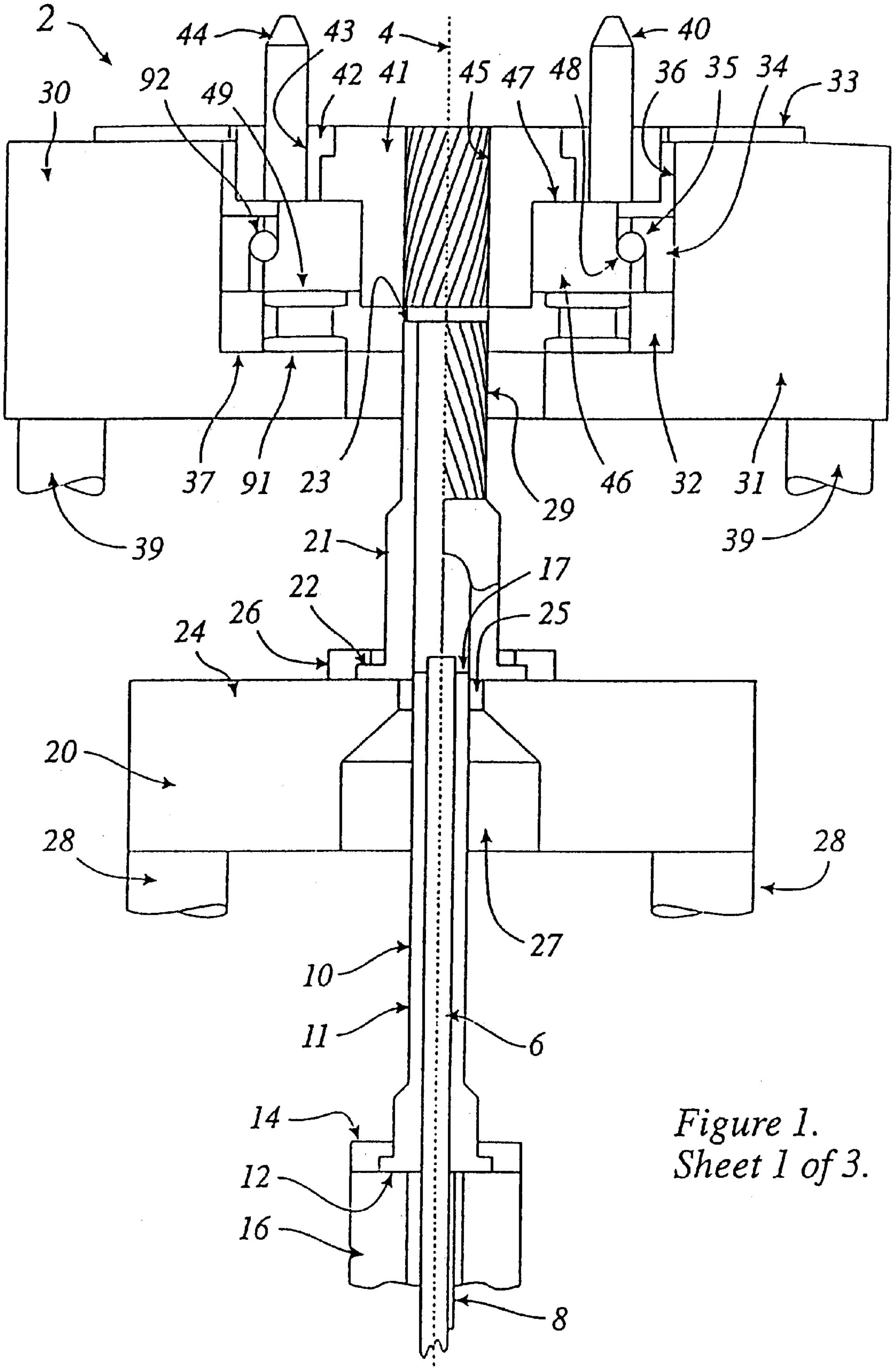
FIG. 1 is an exploded view of two embodiments of the powder metal press of the present invention.
Figure 1:
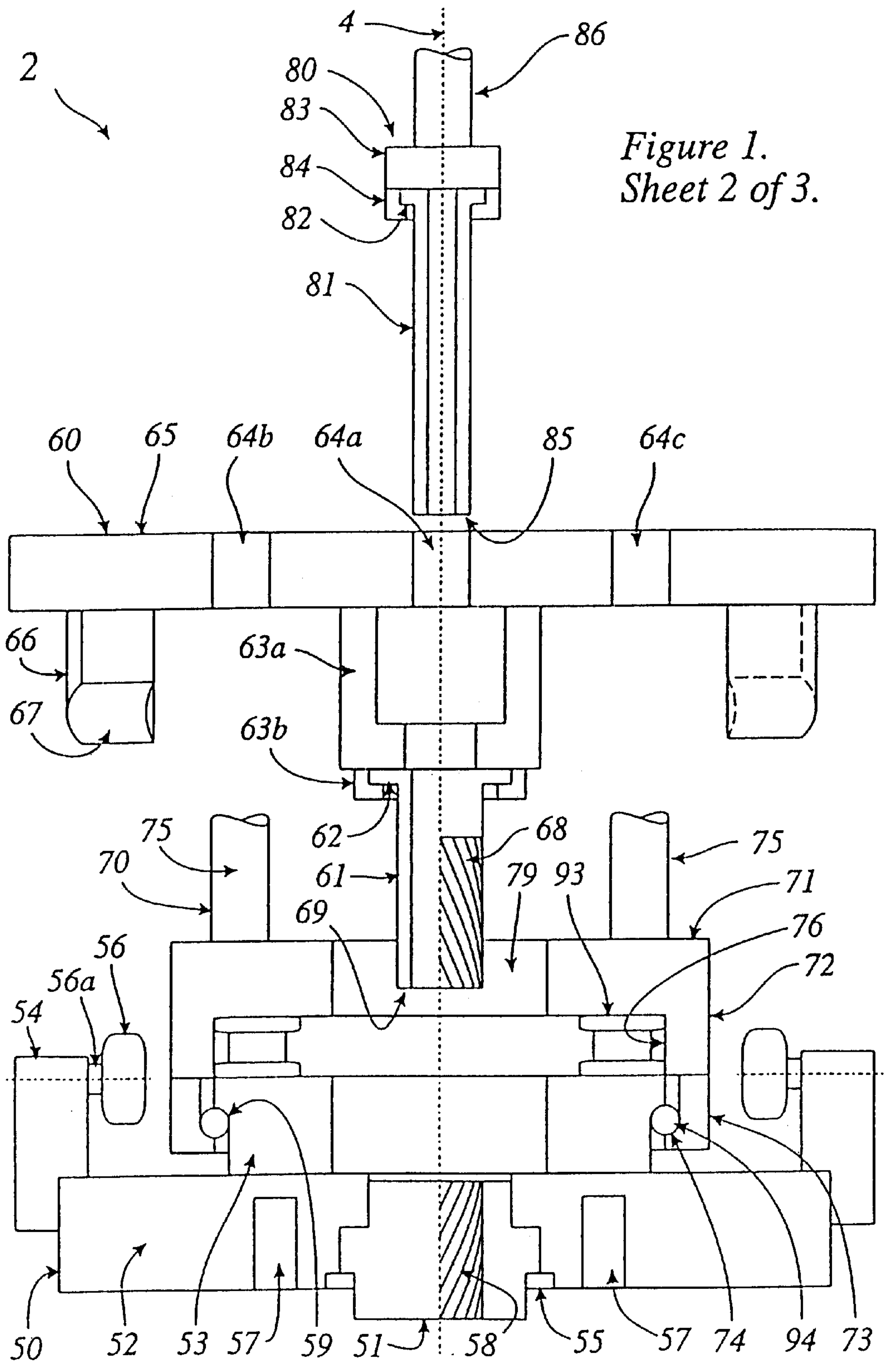
Figure 1:
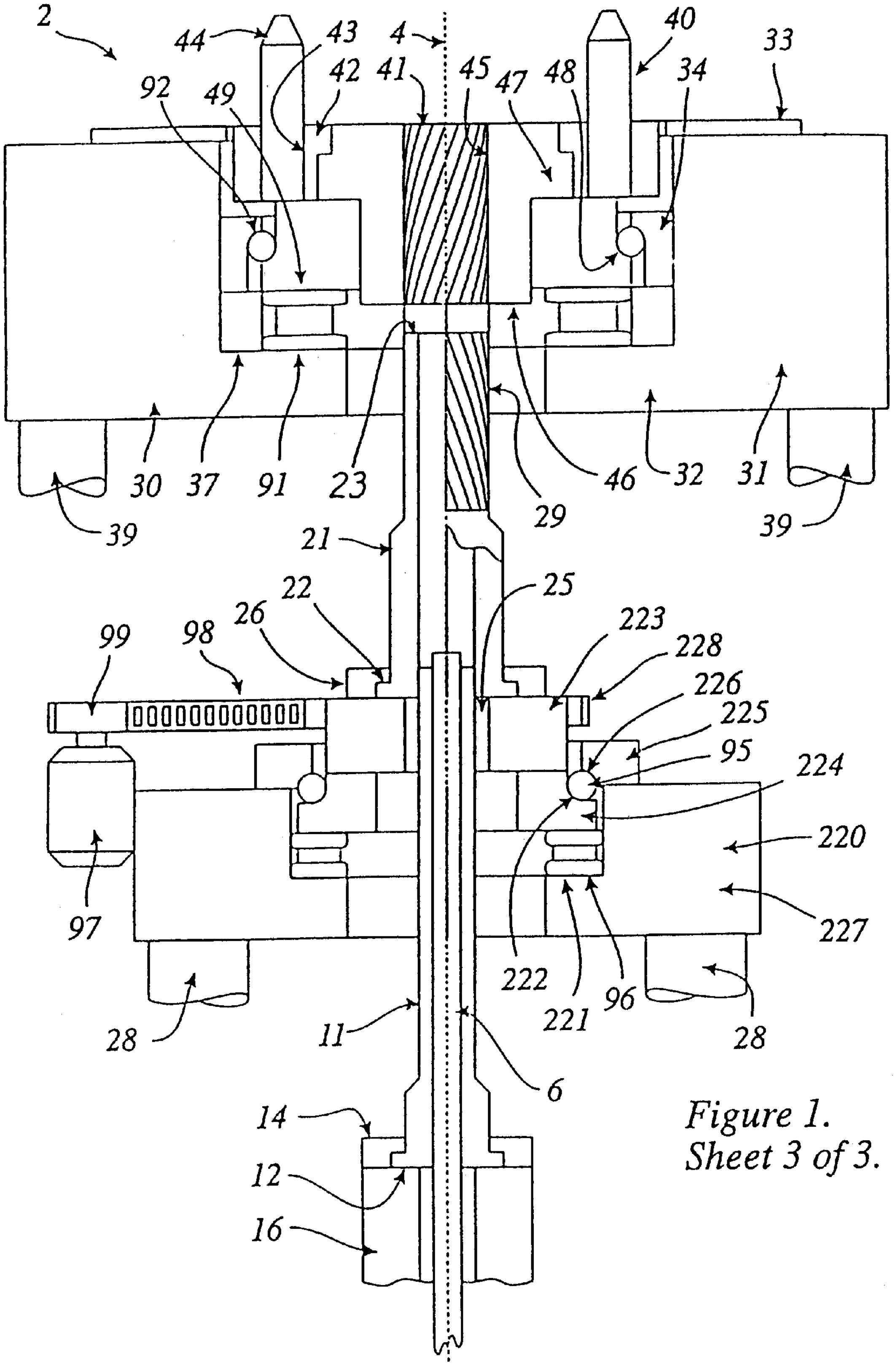

Sheet 1 of 3 of FIG. 1 illustrates the lower portions of a tool set of the present invention including a core rod, lower inner punch assembly, lower outer punch assembly and rotating lower die assembly.

Sheet 2 of 3 of FIG. 1 illustrates a corresponding upper portion of the tool set of the present invention including a rotating upper die assembly, upper outer punch assembly, and inner punch assembly.

Sheet 3 of 3 of FIG. 1 illustrates an alternate embodiment of the lower portions of the tool set of the present invention, differing from Sheet 1 in having a rotating lower outer punch assembly.

Figure 2:
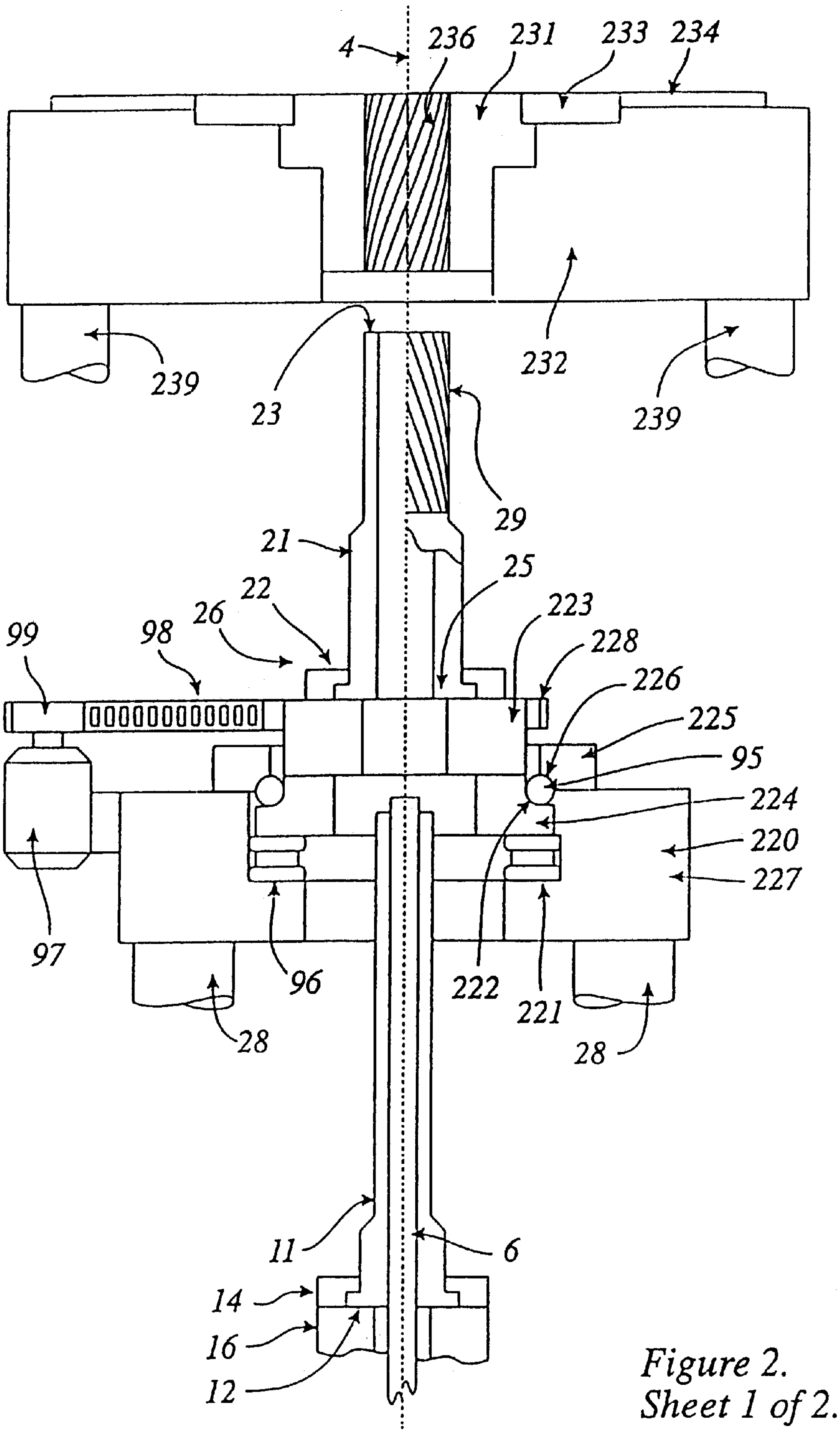
Figure 2:
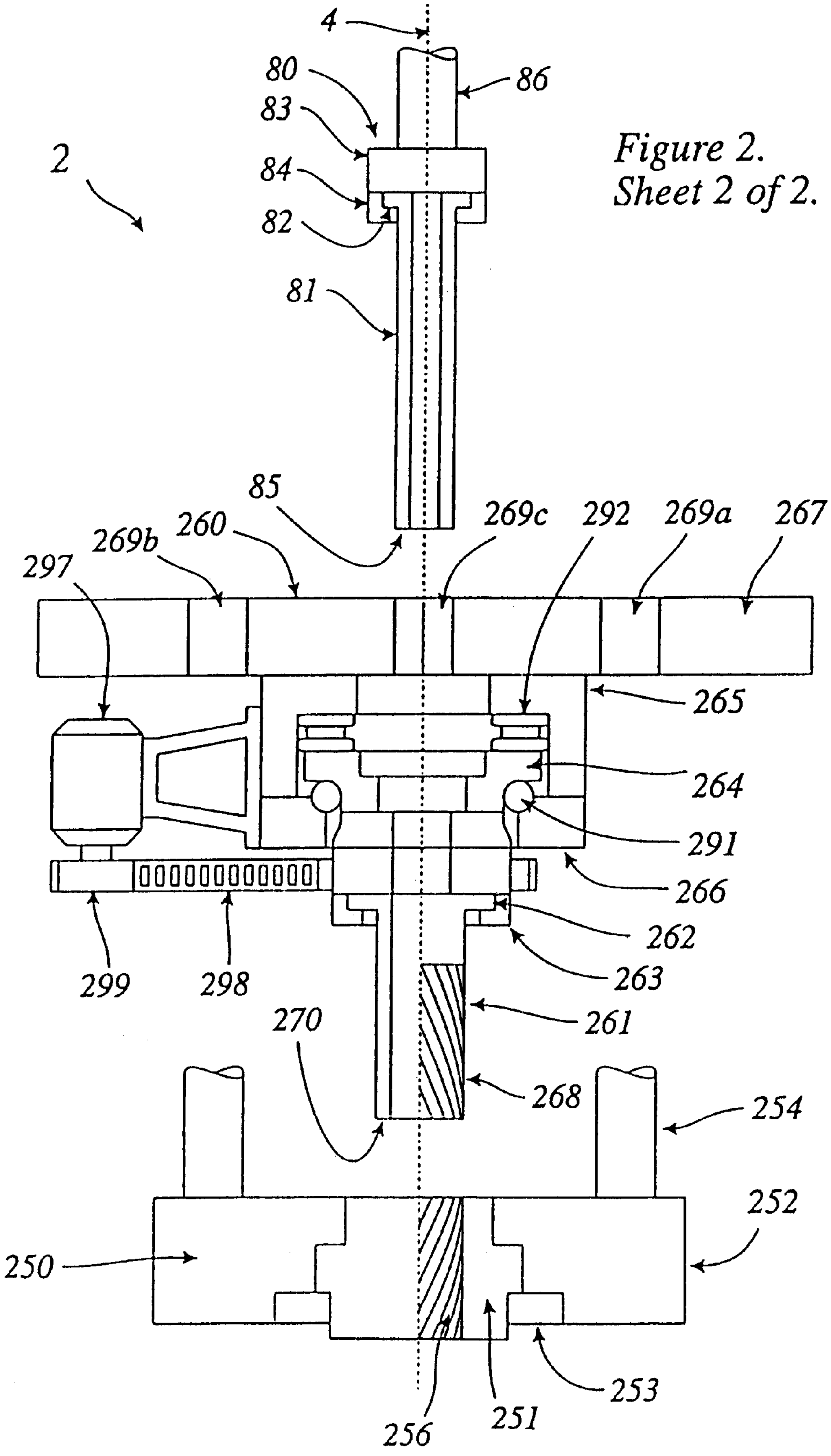

FIG. 2 is an exploded view of a third embodiment of the powder metal press of the invention of FIG. 1.

Sheet 1 of 2 illustrates the lower portions of a tool set of the invention of FIG. 1 differing therefrom by a rotating lower outer punch assembly and a non-rotating lower die assembly.

Sheet 2 of 2 of FIG. 2 illustrates the upper portions of a tool set of the invention of FIG. 1 differing therefrom by a rotating upper outer punch assembly and a non-rotating upper die assembly.

Figures 3A, 3B:
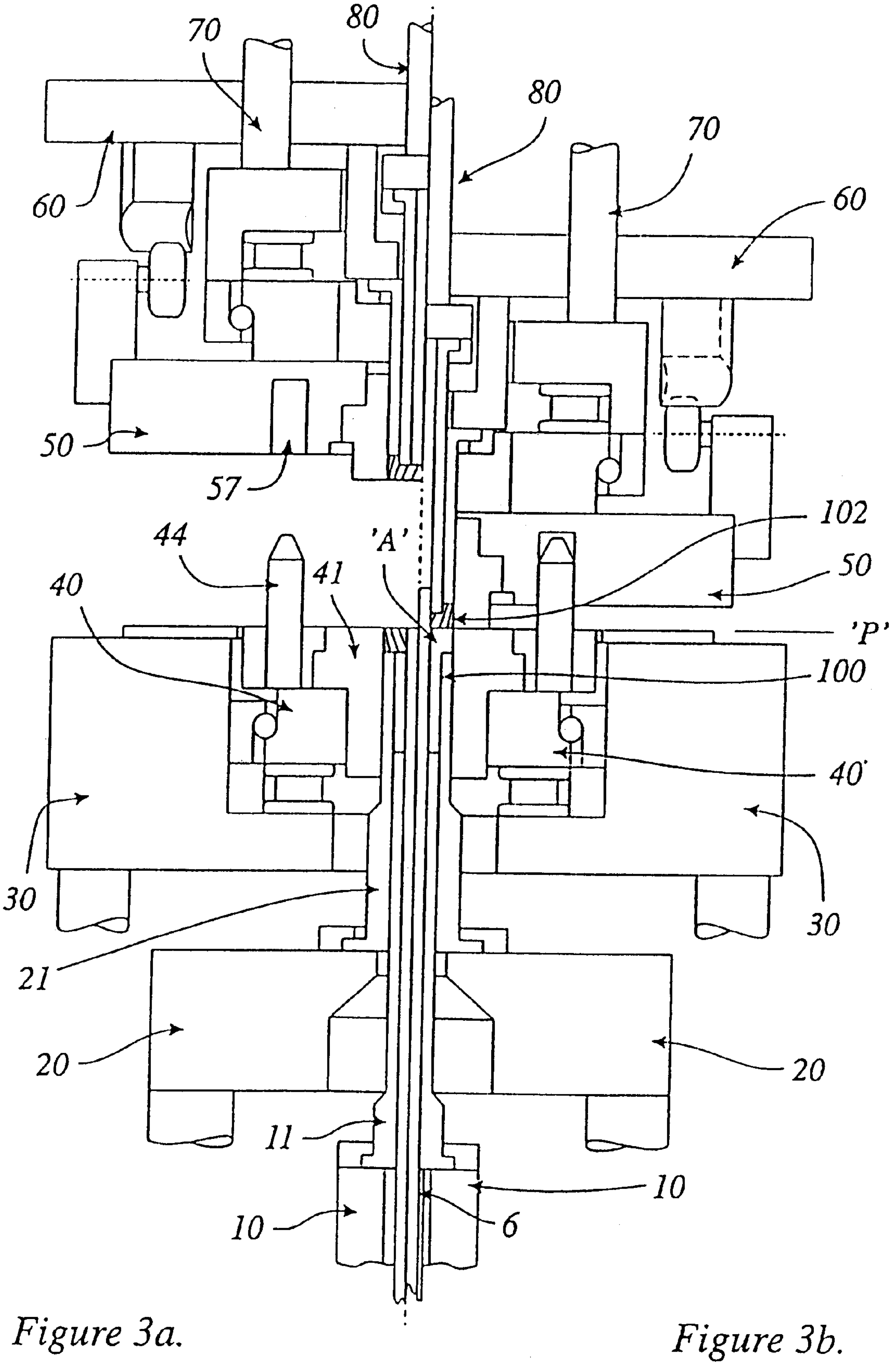
Figures 3C, 3D:
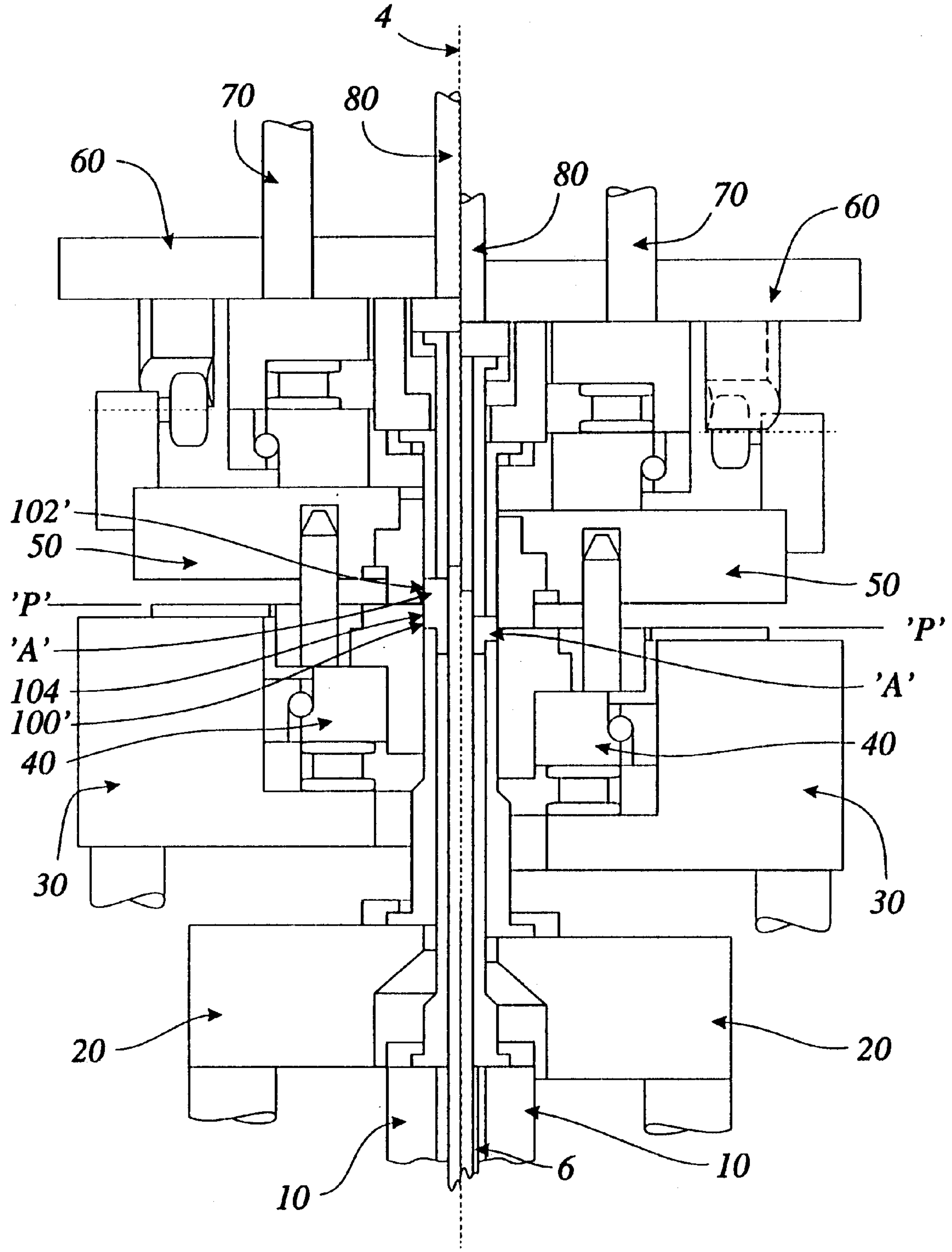
Figures 3E, 3F:
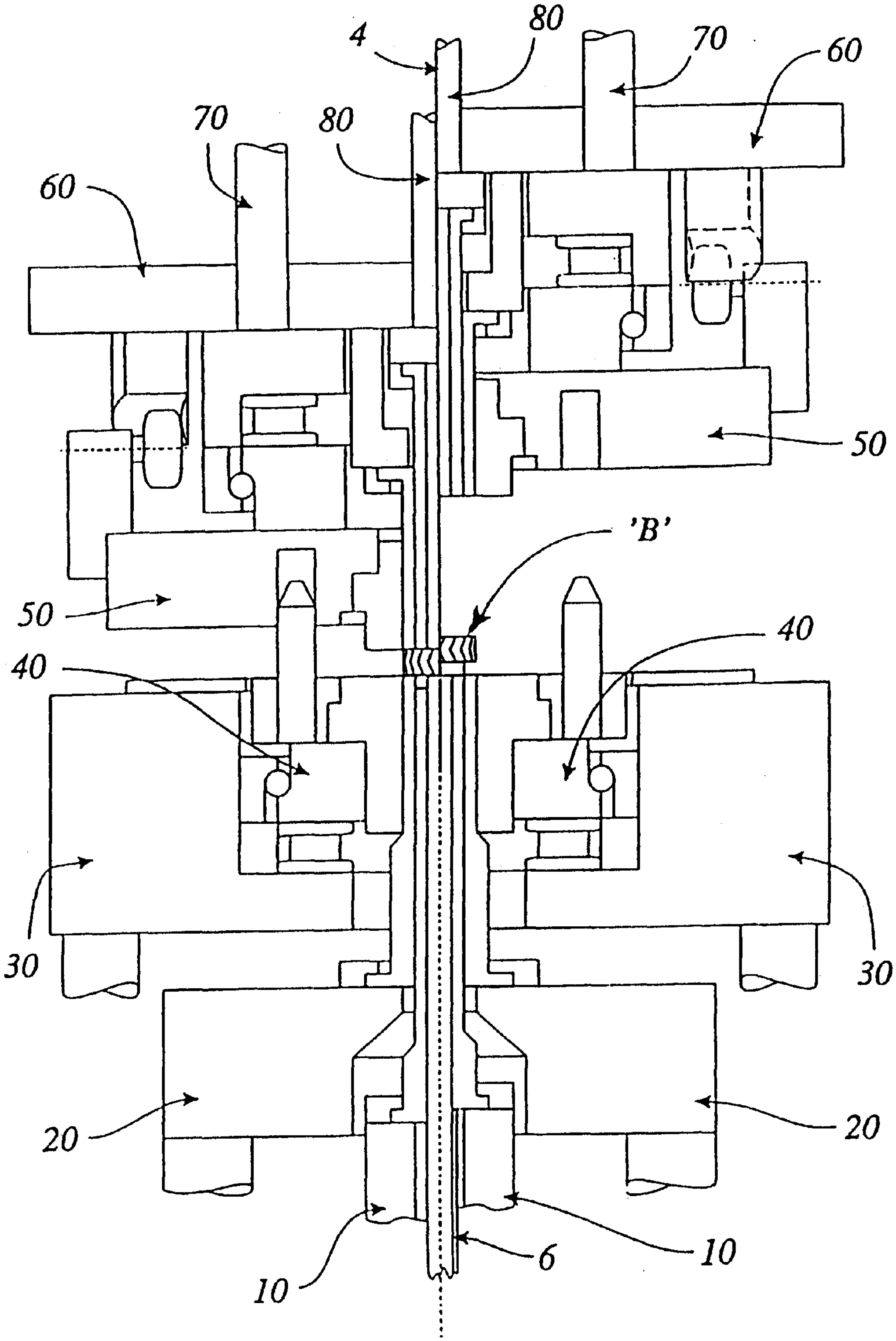

FIG. 3 shows a sequence of views, being FIGS. 3*a* through 3*f* which illustrate a progression of steps by which the invention as illustrated in sheets 1 and 2 of 3 of FIG. 1 is used to compress powder metal to form a powder metal powder compact.

FIG. 3*a* shows a cross-section of a tool set in the filling position.

FIG. 3*b* shows the same tool set with upper and lower portions brought together prior to the transfer step.

FIG. 3*c* shows the tool set after transfer and before compaction.

FIG. 3*d* shows the tool set after compaction and before withdrawal.

FIG. 3*e* shows the tool set after withdrawal and before ejection.

FIG. 3*f* shows the tool set in the ejection position.

Figures 4A, 4B:
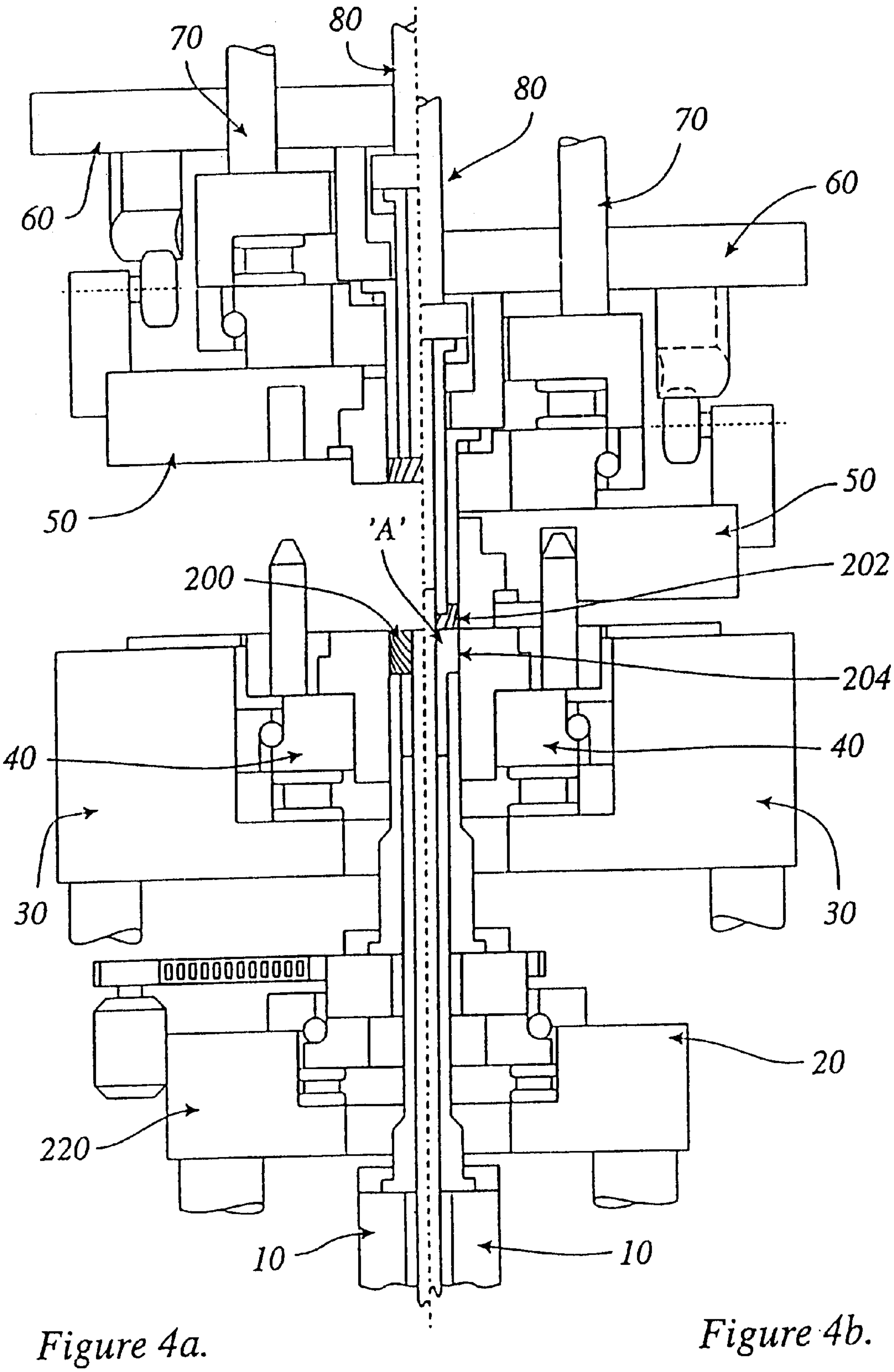
Figures 4C, 4D:
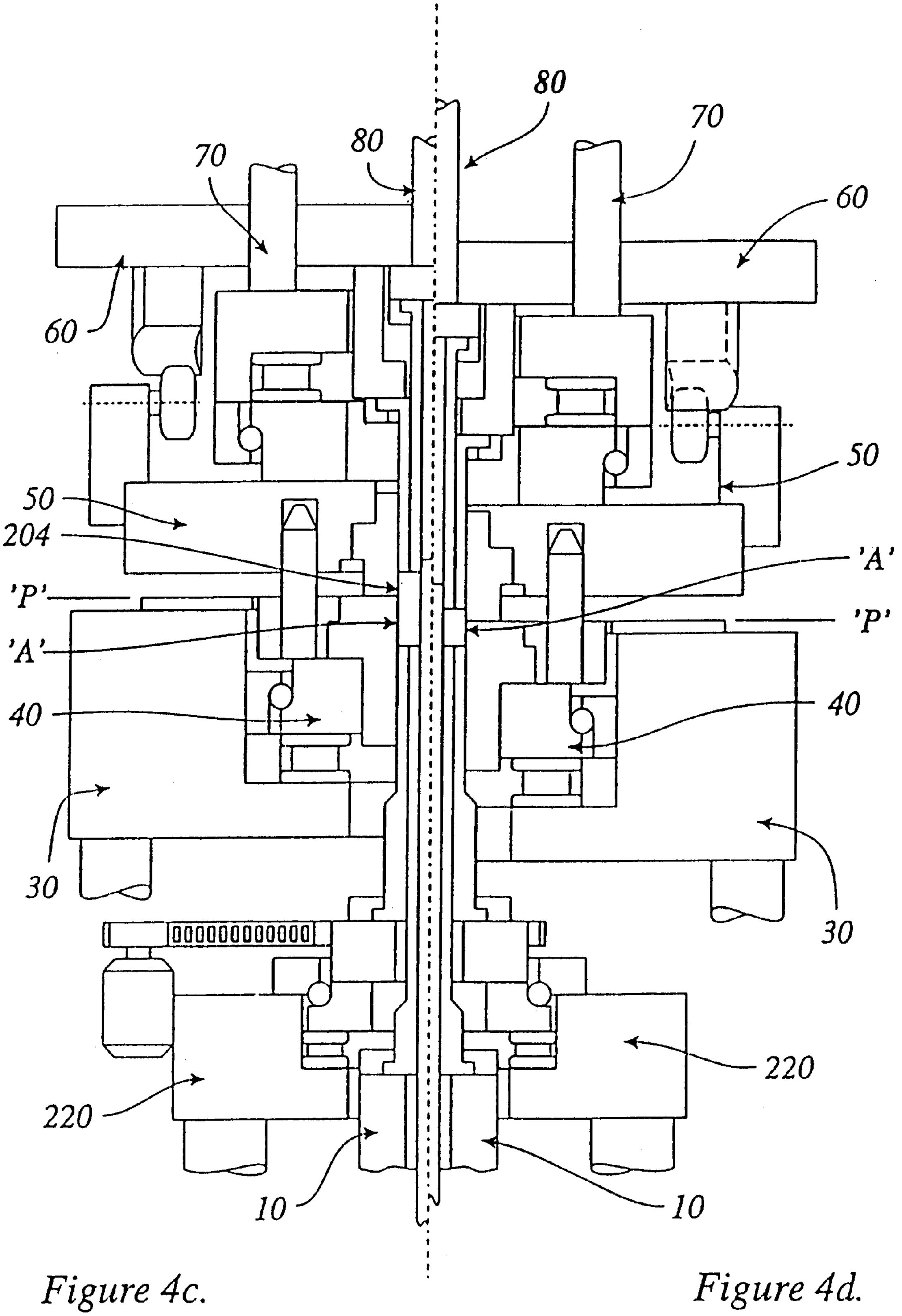
Figures 4E, 4F:
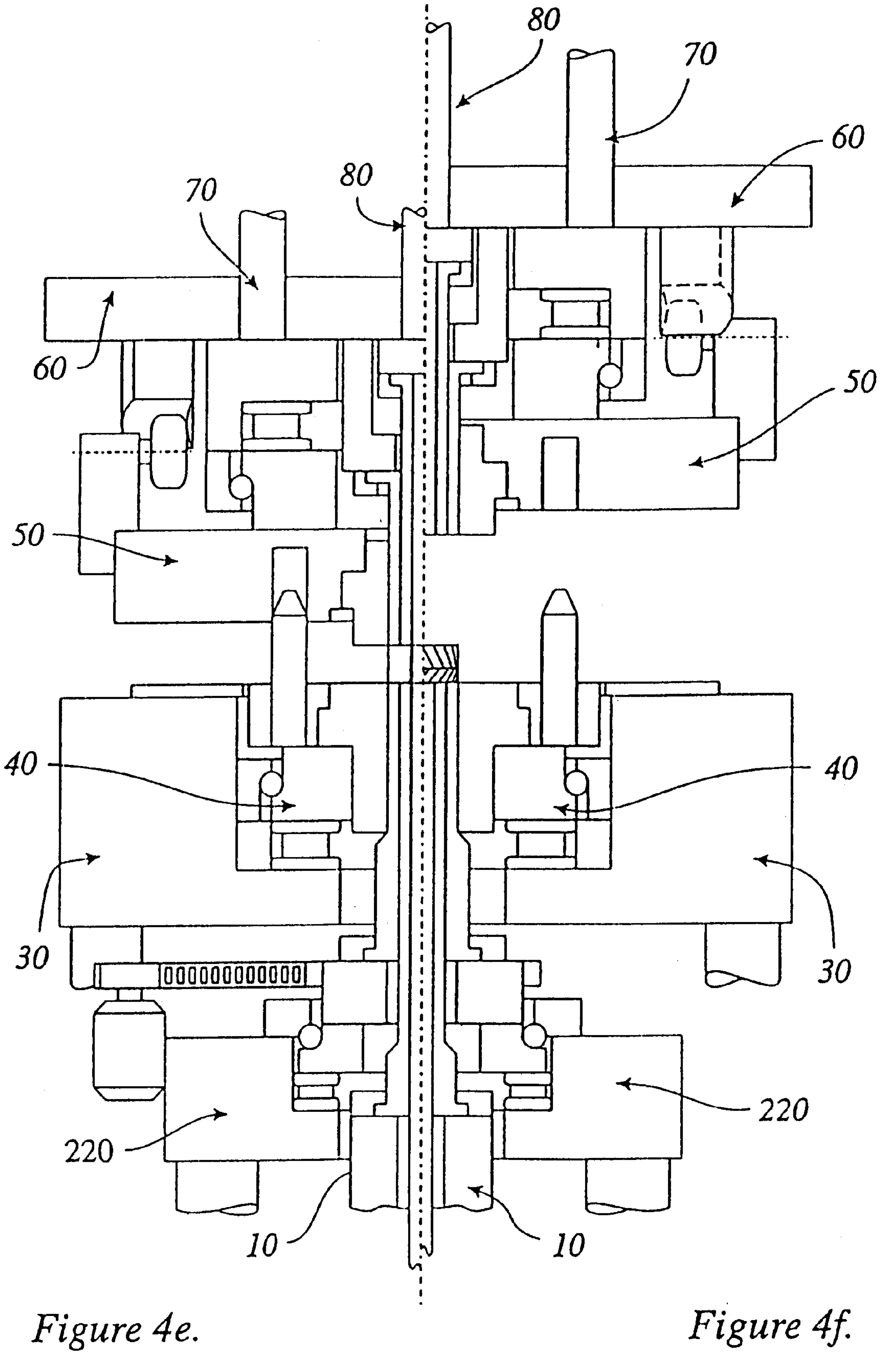

FIG. 4 shows a sequence of views, being FIGS. 4*a* through 4*f* which illustrates the progression of steps by which the invention as illustrated in sheets 2 and 3 of 3 of FIG. 1 is used to form a green powder metal compact, FIGS. 4*a*, 4*b*, 4*c*, 4*d* and 4*f* corresponding to FIGS. 3*a*, 3*b*, 3*c*, 3*d* and 3*f* and FIG. 4*e* illustrating a tool set after top ram retraction (ejection).

Figures 5A, 5B:
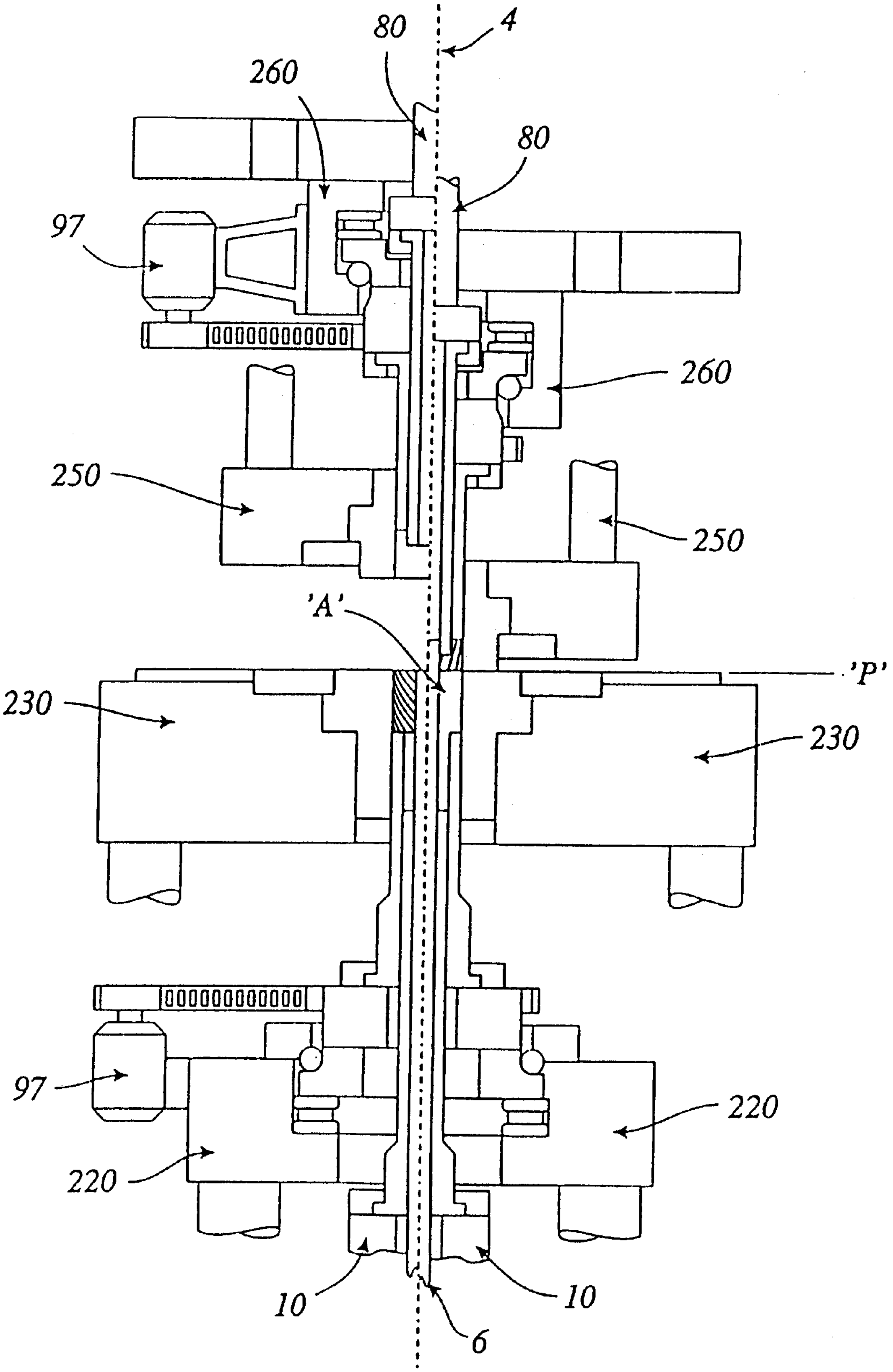
Figures 5C, 5D:
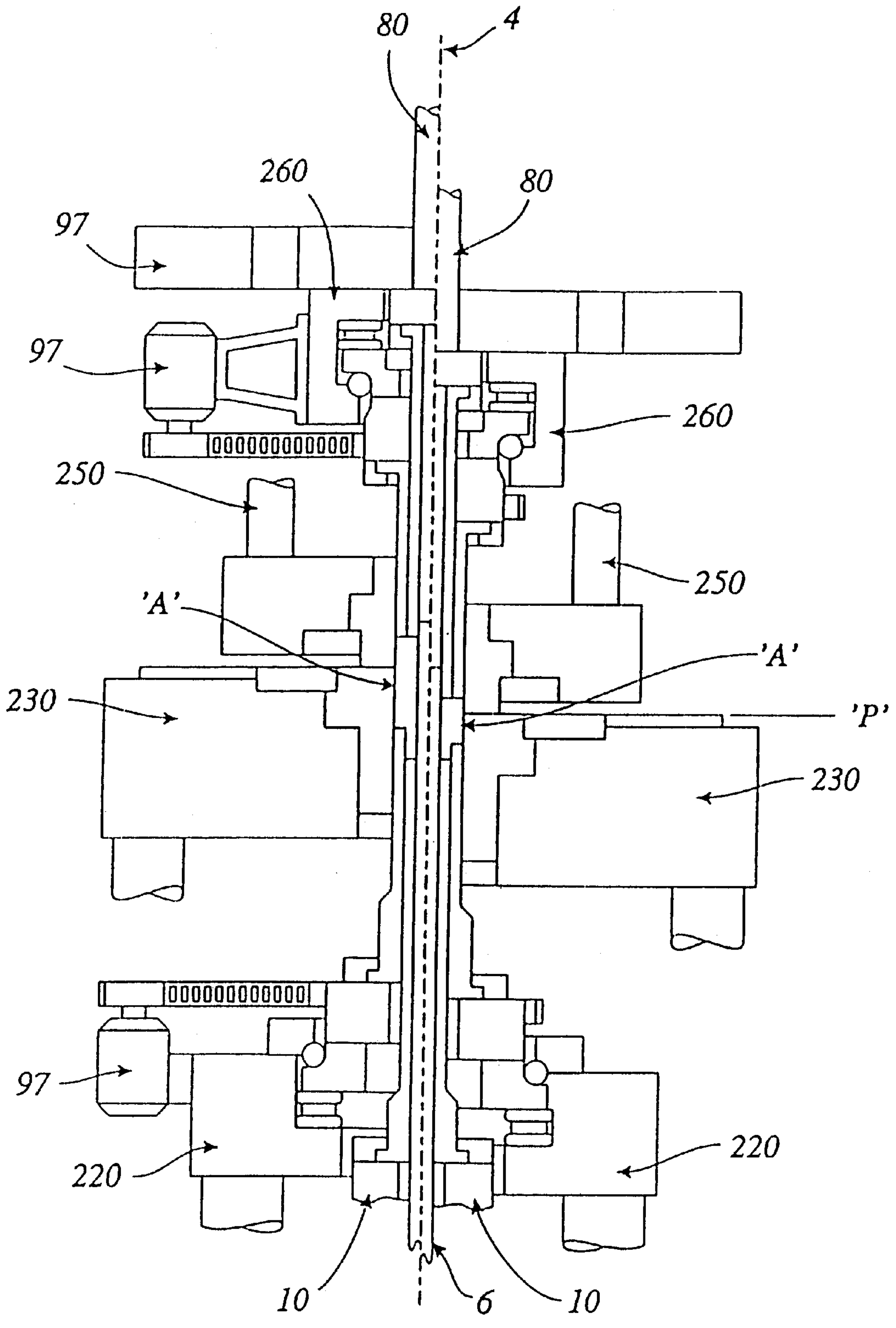
Figures 5E, 5F:
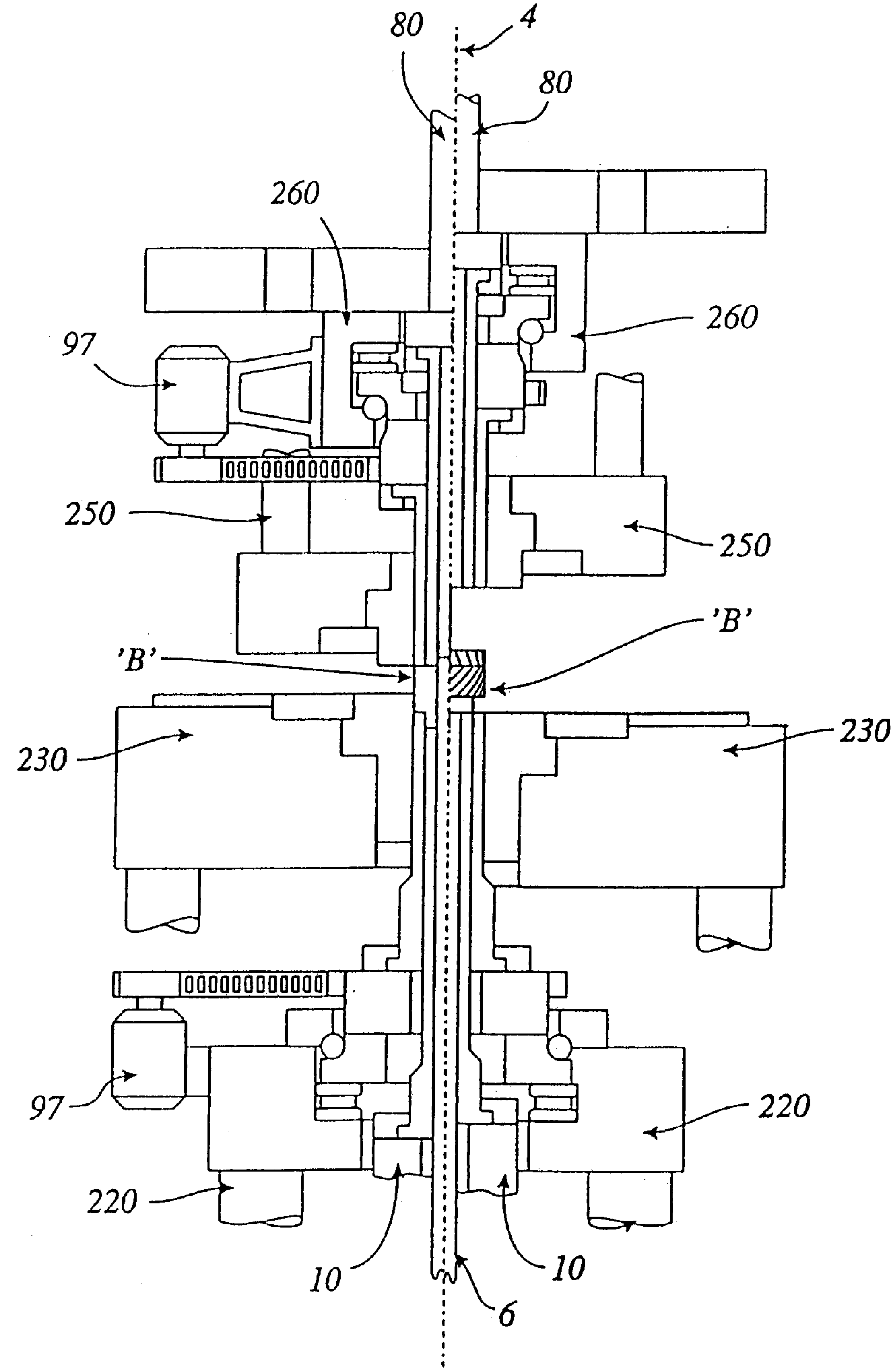

FIG. 5 shows a sequence of views, being FIGS. 5*a* through 5*f*, corresponding generally to FIGS. 3*a* through 3*f*, for the embodiment present invention shown in FIG. 2, FIG. 5*e* showing a partial withdrawal position, and FIG. 5*f* showing a full withdrawal and ejection position.

Figure 6:
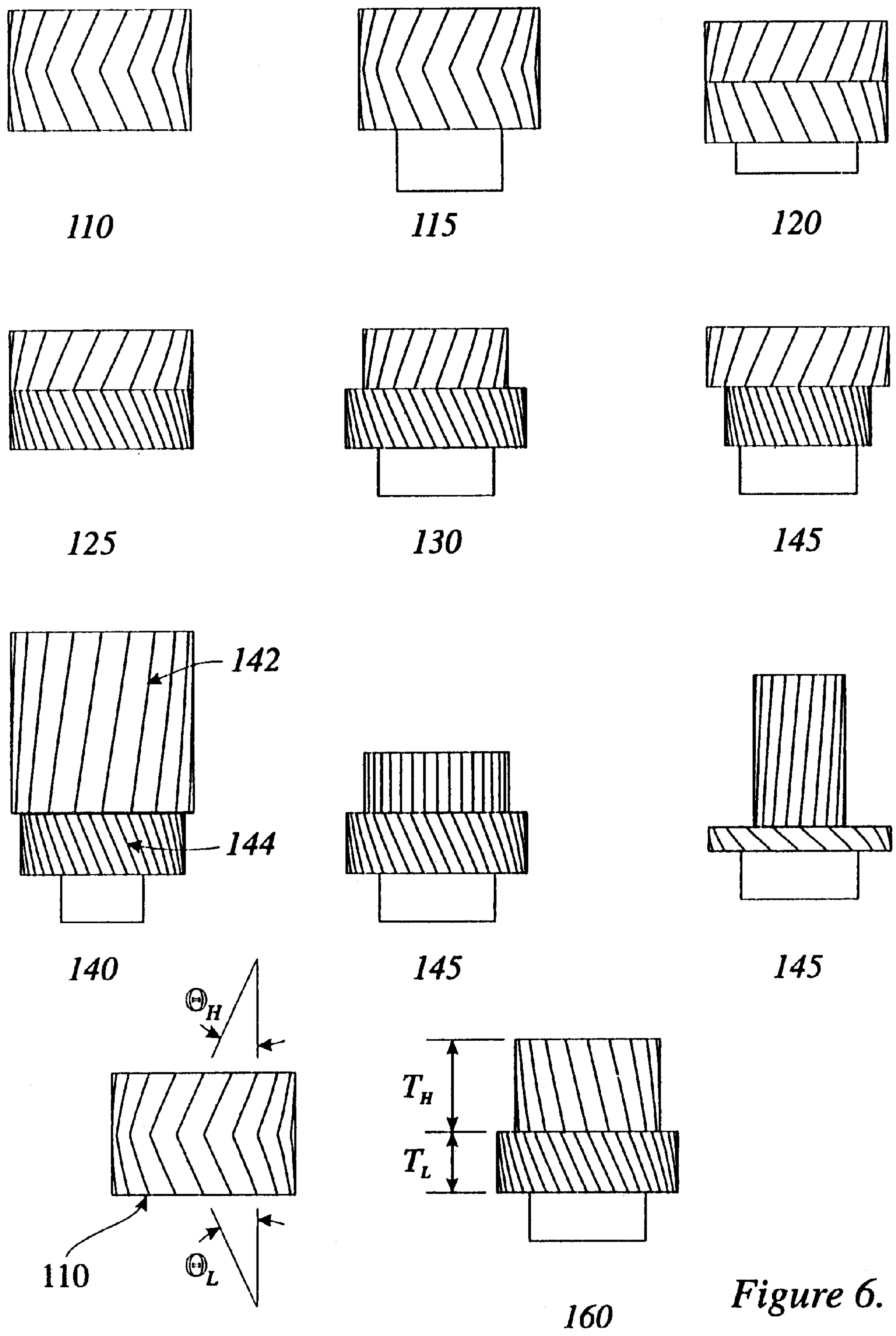

FIG. 6 shows a variety of gears which may be produced with one or more of the embodiments of the invention of FIG. 1.

NOTE: FIGS. 1 through 5 are all cross sectional views of powder metal compact press tool sets. Cross hatching has been omitted for clarity.

DETAILED DESCRIPTION OF THE BEST MODE FOR CARRYING OUT THE INVENTION

A preferred embodiment of the tool set of the multiply acting powder compacting press of the present invention is shown on Sheet 1 of 3 of FIG. 1 as 2, and has a central vertical axis 4. It comprises a number of assemblies which if described as distinct groups may facilitate understanding of the description of operation of the press hereinbelow. A core rod is shown as 6. Grouped assemblies are indicated as an inner lower transfer punch assembly 10, an outer lower punch assembly 20, a lower die support assembly 30, a lower die carrier 40, an upper die carrier 50, an upper, outer punch assembly 60, an upper die support assembly 70, and an upper, inner, pre-lift punch assembly 80. In addition four sets of bearings are shown. They are a lower thrust bearing 91, a circumferential captured ball bearing race, or lower rotational bearing 92, an upper thrust bearing 93, and an upper rotational bearing 94.

As seen in the expanded view of Sheet 1 of 3 of FIG. 1, core rod 6 is a solid shaft which may be moved vertically along central axis 4, of press 2. Rod 6 may also comprise a radially extending spline 8, or splines, as desired. A single such spline with rectangular cross section may be used to form a keyway in the resultant part. Male spline 8 may as easily be a straight keyway or straight spur gear profile.

Inner lower transfer punch assembly 10 includes an inner lower transfer punch 11, having a radially extending flange 12, a retaining ring 14, and an inner pedestal 16 which may be vertically driven by a ram. Retaining ring 14 captures flange 12 against pedestal 16. In the preferred embodiment transfer punch 11, and indeed all of transfer punch assembly 10, is mounted concentrically about axis 4 in close tolerance sliding relationship about rod 6. Inner lower transfer punch 11 has an annular distal end face 17 perpendicular to, and concentric about, axis 4. In the preferred embodiment the external, outer face of transfer punch 11 is smooth in the vertical direction, having neither helical splines nor threads, but, as noted, under same circumstances an external spline, or spur gear profile could be used, in a manner similar to male spline 8 of core rod 6.

Outer lower punch assembly 20 includes an outer lower punch 21 having a radially extending flange 22, a support plate 24, a retaining ring 26, and a pair of driving rams 28 or a mechanical equivalent. Support plate 24 has a central passage 25 to allow outer lower punch assembly 20 to be disposed concentrically about inner lower punch assembly 10, and a cavity 27 to accommodate relative travel of inner lower transfer punch 11. As shown on the external scab view portion of outer lower punch 21, the distal end circumferential outer face 29 of outer lower punch has a helical gear profile corresponding to the desired profile of the final part. Retaining ring 26 mounts to support plate 24 concentrically about axis 4 thus capturing flange 22 of lower outer punch 21. Lower outer punch 21 has an annular distal end face 23 perpendicular to and concentric with axis 4.

Lower die support assembly 30 is also carried concentrically about axis 4. It comprises a main plate 31, a bearing locating ring 32, a filler wear plate 33, and a bearing retainer 34 having an outer bearing race 35. Main bearing plate 31 comprises a counterbore 36 terminating at a radially inwardly extending shoulder 37. Lower die assembly 30 is mounted on rams 39. Those skilled in the art will recognize that rams 39, like rams 28, may actually be connecting rods driven by remotely located rams, not shown. In all cases the purpose of rams 39, or a mechanically equivalent substitute, is to control the position and motion of lower die assembly 30.

Lower die carrier 40 is also mounted concentrically about axis 4 and comprises a lower die 41, a clamping ring 42, having blind holes 43 in which transfer pins 44 are fixedly located. Lower die 41 has an inner face 45 which has the negative profile of the helical gear part desired and is suited for close tolerance helically sliding engagement of the externally threaded gear profile of outer face 29 of lower outer punch 21. Lower die carrier assembly 40 also comprises a carrier base 46.

Bearing locating ring 32 is mounted upon shoulder 37 within bore 36, and serves as a radial retainer for a lower thrust bearing 91. Base 46 rests upon thrust bearing 91. Bearing retainer 34 is bolted to locating ring 32 to trap lower rotational bearing 92 between an inner bearing race 48 and outer bearing race 35, thus capturing base 46 and preventing vertical displacement of base 46 relative to main plate 31. A thick flange 47 of die 41 rests on base 46. Clamping ring 42 seats about die 41, capturing flange 47 as it is bolted to base 46. Filler wear plate 33 is mounted to main plate 31 about lower die carrier 40 to prevent wear of main plate 31 during repeated sweeping of powder metal.

From this description it follows that longitudinal relative motion between lower die 41 and lower outer punch 21 will necessarily be accompanied by a rotational component of motion, and that such longitudinal and rotational components of motion will prevail in all of lower die carrier 40 relative to lower outer punch assembly 20. Further, once clamping ring 42 is in place there is, ideally, no relative vertical motion between assembly 30 and carrier 40.

Upper die carrier 50 is also mounted concentrically about axis 4, and comprises an upper die 51; a main plate 52 into which die 51 seats; a bearing backing ring 53 to support main plate 52; at least one crank arm 54 mounted to, and at a location near the periphery of, main plate 52 and extending upwardly therefrom; a stub shaft 56*a* extending laterally from the distal end of crank arm 54; a roller 56 mounted in a conventional manner to rotate about stub shaft 56*a*; and a number of blind indexing holes 57 for intermittent enregistration of such torque transmitting stub shafts 44 as may protrude upwardly from assembly 40. An inner face 58 of die 51 carries the negative image of the helical gear face to be produced, but will be of an opposite hand to that of lower die 41. The outer circumferential face of backing ring 53 is provided with an inner bearing surface, or inner race 59 for engagement of bearing 94. Locking ring 55 is utilized to capture die 51 within plate 52.

Upper outer punch assembly 60, again concentrically mounted about axis 4, includes upper outer punch 61 having a radially extending flange 62; a pedestal 63*a* to which upper outer punch 61 is mounted when flange 62 is captured by a retaining ring 63*b*; a main platten 65 to which pedestal 63*a* is fixedly mounted; at least one depending cam 66 affixed to an outer portion thereof, depending cam 66 itself having a cam surface 67; a central passage 64*a* to accommodate pre-lift assembly 80; and at least two through passages 64*b* and 64*c* for accommodating upper die support assembly 70. As can be seen in FIG. 3, cam 66 depends in such a manner as to present cam surface 67 at a suitable radius from axis 4 to co-operate with roller 56, whose mutual interaction is more fully described hereinbelow. The downwardly extending, circumferential surface of outer upper punch 61 carries adjacent its distal end, a close tolerance mating male helical external profile 68 suitable for engagement with inner face 58 of upper die 51, again being oppositely handed to lower outer punch 21. Upper outer punch 61 comprises an annular, distal end face 69 perpendicular to axis 4.

As with lower die 41 and lower outer punch 21, longitudinal motion of upper die 51 relative to upper outer punch 61 is accompanied by a rotational component of motion about axis 4 by die 51 relative to upper outer punch 61. Although auto-rotating tool sets are encompassed in the present invention, in the preferred embodiment this rotational motion will be driven as main platten 65 moves downward relative to disc 71, and hence main plate 52, due to the rotational impetus of the torque transferred to main plate 52 through crank 54 as roller 56 works along cam face 67. This may tend to reduce die friction, enhance die life, or reduce the shear imposed on the powder.

Similarly, the rotational motion of lower die 41 is imposed by the torque transferred by stub shafts 44 in close engagement with blind indexing holes 57. Thus the rotational motion of lower die carrier 40 is ultimately driven by the interaction of roller 56 and cam face 67. Thus matching rotation of both upper and lower assemblies of press 2 can be achieved with a single drive, giving a less complicated press.

Upper die support assembly 70, co-axially mounted about axis 4, includes a disc 71 having a thick, downwardly extending skirt 72; an upper circumferential outer bearing ring 73 depending from skirt 72, bearing retaining ring 73 comprising on its inwardly facing surface an outer bearing retaining race 74 which co-operates with inner race 59 of backing ring 53 to contain bearing 94; and at least two symmetrical pistons 75 fixedly abutting the upper surface, or base, of disc 71. As before, pistons 75 may be any mechanical equivalent of a piston, a ram or a connecting rod for controlling the reciprocating motion of upper die support assembly 70. Disc 71 has a central aperture 79 through which pre-lift assembly 80, outer upper punch 61 and pedestal 63*a* are introduced and, in use, which aperture 79 accommodates the longitudinal reciprocating motion thereof. Downwardly extending skirt 72 has an inner face 76 of a diameter chosen to surround in close tolerance upper thrust bearing 93, which seats therein and against the downwardly exposed inside face of the base of disc 71. The opposite, downward face of thrust bearing 93 engages the upward face of backing ring 53.

Upper inner pre-lift assembly 80 is disposed concentrically along axis 4 in the same manner as the other assemblies. It includes upper inner, or pre-lift punch 81, having a radially extending flange 82; a footing 83 against which pre-lift punch 81 is held in abutting relationship by a retaining ring 84; and piston 86 which abuts the opposite face of footing 83. Prelift punch 81 comprises a distal annular face 85 perpendicular to axis 4.

Upper die 51 and lower die 41 need not necessarily be of the same diameter; they need not be in phase, that is to say, the addendum of a tooth on one half may, for example, be aligned opposite the dedendum between teeth on the opposite side. It is nonetheless anticipated that the majority of parts manufactured by the instant apparatus and method will be opposed double helical, symmetrical, in phase gears, commonly referred to as herringbone gears.

Having thus enumerated the components of the tool set of the present invention, a tool set may be defined as comprising core rod 6, inner lower transfer punch 11, lower outer punch 21, lower die 41, upper die 51, upper outer punch 61 and pre-lift punch 81. As such the tool set comprises those parts which contact the powder, and which constitute the negative images of the faces of the compact eventually produced. The tool set need not always include a pre-lift punch, and, although uncommon, may not necessarily include a core rod.

The operation and interaction of the various assemblies will now be described with the aid of the series of FIGS. 3*a* through 3*f*.

FIG. 3*a* illustrates a filling position in which the upper and lower parts of press 2 are separated. Rod 6 is at its first position, and stands flush with the upper face of lower die 41. Inner lower transfer punch 11 is at its lowest, retracted position. Outer lower punch 21 is at its first, highest, extended position. Lower die 41 is at its first, highest position, which is also the reference position of zero degrees of rotation. A lower chamber 100 is defined by the annular pocket formed between rod 6 and lower die 41, that pocket having two depths, a deep inner portion above lower inner transfer punch 11, and a shallower portion above outer lower punch 21. A charge of metal powder of the desired alloy, indicated as "A" is loaded into chamber 100, and swept level as shown in FIG. 3*b*.

In FIG. 3*b* core rod 6 has been advanced, thereby preventing powder from entering the central passage in pre-lift punch 81, and then the upper assemblies, that is, upper die carrier 50, upper outer punch assembly 60, upper die support assembly 70, and upper pre-lift assembly 80, have been advanced in unison such that the lower face of upper die 51 abuts the upper, mating face of lower die 41 at a parting plane 'P' defined by these abutting faces. This advance is a question of relative motion, since it may be achieved by moving either the upper assemblies or lower assemblies, whether singly or both at once. In the embodiment shown the lower assemblies, that is inner lower transfer punch assembly 10, outer lower punch assembly 20, lower die support assembly 30, and lower die carrier 40, remain stationary while the upper assemblies 50, 60, 70 and 80 advance. Stub shafts 44 register within indexing holes 57. Disc 71 is at its maximum extension from platten 65. Roller 56 is at its first, zero degrees of rotation position relative to cam face 67. Upper die 51 is at its first, most extended position relative to upper outer punch 61. Upper inner, pre-lift punch 81 is at its maximum, extended position relative to platten 65. An upper chamber 102 is defined by the annular space between rod 6 and the inner face of upper die 61, the top of the chamber being stepped, a first step corresponding to the distal end face 85 of pre-lift punch 81, and the second, outer step corresponding to the distal end 69 of outer upper punch 61.

Transition from FIG. 3*b* to FIG. 3*c* is the step of transferring uncompressed powder to fill chamber 102 with powder transferred from chamber 100 as the volume of chamber 100 decreases due to the advance of inner lower transfer punch 11. In the embodiment shown inner lower punch assembly 10 remains stationary while rod 6 and all of assemblies 20, 30, 40, 50, 60, 70, and 80 advance downwardly together to a second, longitudinal, transfer position. Initially the relatively raised position of prelift punch 81 encourages powder to travel radially to fill the radial gear tooth extremities of dies 41 and 51. As the combined volume of chambers 100 and 102 decreases pressure builds against pre-lift punch 81 and it retracts relative to outer upper punch 61. The limit of this retraction is reached when footing 83 abuts main platten 65. Further downward motion of main platten 65 will carry prelift punch 81 downward as well. In this position distal end 85 of pre-lift punch 81 is, in the preferred embodiment, flush with distal end 69 of outer upper punch 61. In other embodiments one may wish the ends of either of the aforementioned punches to impress a non-flat, or non-flush profile on the compacted powder, and it is not always necessary to incorporate a pre-lift punch. To this point there has been no relative longitudinal motion between upper outer punch 61 and upper die 51, and therefore no rotational motion. At the completion of the transfer step the combined volume of chambers 100[1] and

102$^1$ is more or less equal to the former volume of chamber 100 in the filling step illustrated in FIGS. 3*a* and 3*b*.

Transition from FIG. 3*c* to FIG. 3*d* represents the compaction step. Lower inner punch 11 remains stationary. Rod 6 and main platten 65 continue to move downwardly. Pistons 75 draw disc 71 to a second, partially displaced position, closer to platten 65. Consequently roller 56 is forced against, and along, cam face 67, rotating all parts of carriers 40 and 50 to a second, partially rotated position. This causes assembly 30 and carrier 40 (and, incidentally, 50) to move longitudinally downward relative to assemblies 10 and 20. For plane of abutment 'P' to remain constantly equidistant from the opposed end faces 23 and 69 of punches 21 and 61 the rate at which main platten 65 is driven downward must be twice the rate at which disc 71 is drawn toward main platten 65. A typical compaction process may reduce the combined volume of chambers 100 and 102 by about 50%, roughly doubling the density of the powder from its loose state to its compacted state.

At the second, partial, or mid-way position of travel of roller 56 along cam face 67 one reaches the position shown in FIG. 3*d*. The transition from FIG. 3*d* to FIG. 3*e* is the withdrawal step. Inner lower punch 11 and outer lower punch 21 remain stationary. Main platten 65 ceases to advance, and therefore outer upper punch 61 is stationary as well. Pistons 75 continue to withdraw disc 71 toward main platten 65. Consequently roller 56 continues to advance along cam face 67, forcing carriers 40 and 50 to a third, fully rotated position. Since upper outer punch 61 and outer lower punch 21 are stationary, and opposite-handed, the net effect is that dies 41 and 51 withdraw from each other like unwinding turnbuckle halves, causing chambers 100 and 102 to open and disappear, leaving a workpiece, indicated as 'B', exposed. As illustrated the resultant green form part, workpiece 'B', has the desired opposite-handed mating helical gear profiles of a herringbone gear.

As disc 71 withdraws lower assembly 40 will only continue to rotate as long as stub shafts 44 engage index holes 57. To that end the overlapping length of stub shafts 44 within index holes 57 exceeds the longitudinal travel of disc 71 relative to main platten 65 from the first position corresponding to zero rotation, to the third position, corresponding to full rotation.

The last step in the process, shown in FIG. 3*f*, is to eject the finished part by advancing punch 11. Once workpiece 'B' has been removed punch 11 may be withdrawn, and all other assemblies returned to the positions shown in FIG. 3*a* to await a subsequent charge of powder metal. The relationship of the helical threads of the dies 41 and 51 relative to punches 21 and 61 respectively ensures that roller 56 is once again positioned in the first, zero degrees of rotation position before the next cycle starts.

The process of operation of the preferred embodiment has been described with reference to the body of the press. It may also be described relative to the workpiece, or relative to a press whose upper and lower assemblies have equal and opposite motion relative to a fixed datum. In that case, the press would appear, in terms of relative motion to move from a first, transfer position in which dies 41 and 51 are in longitudinal (relative to axis 4) abutting relationship and the outer punches 21 and 61 are in a retracted, spaced apart relationship, a cavity 104, the sum of chambers 100 and 102, being formed within the space bounded peripherally by dies 41 and 51 and the punches 11, 21, and 61, and 81 if present. Punch 11 would appear to move relative to the plane of abutment 'P' of dies 41 and 51, which may be considered a longitudinal datum, to distribute powder throughout cavity 104.

In the compaction step, punches 11, 21, and 61, and 81 if present, appear to move equally toward the datum of plane 'P' to a second, advanced, spaced apart position while simultaneously rotating dies 41 and 51 through an angle along the helices of punches 21 and 61 between the retracted and advanced positions such that dies 41 and 51 are maintained in their abutting relationship.

In the withdrawal step, punches 21 and 61 appear stationary relative to datum plane 'P', and dies 41 and 51 continue turning to a fully rotated position, such as may be chosen, which causes them to separate.

In the preferred embodiment, taking the unrotated position as zero, the partially rotated position may be 30° and the fully rotated position may be 60°. These values depend on the choices of helix angle and gear thickness.

In the foregoing example of the preferred embodiment it will be noted that only two assemblies, the upper and lower die carriers 50 and 40, respectively, are rotationally driven. As noted, they could be driven with independent numerically controlled motor drives or other means to provide a torque to overcome die friction. A cam system with transfer pins as shown is simple and reliable.

Drives are not necessarily required. Herringbone gears having a helical pitch angle less than 15 or 20 degrees and modest thickness may usually be made with auto-rotating dies. The likelihood of jamming and excessive wear of punches and dies increases as helical pitch angle increases. For helical pitch angles greater than 30 degrees a rotational drive is usually necessary. Between 15 and 30 degrees one may require tests to be conducted to determine whether auto-rotation will be satisfactory.

The preferred embodiment shown in FIGS. 3*a* through 3*f* can be used to make double opposed helical gears, whether in or out of phase, and whether of an equal number of teeth or not, and whether of similar diameter or not, provided that the upper and lower helical threads are of opposite hands and provided that the upper and lower dies 41 and 51 rotate through the same angle during compression. If dies 41 and 51 do not rotate through the same angle and if compression is not proportionate to the final upper and lower part thickness above and below the die parting plane 'P' the powder charge is subject to shearing.

The preferred use of this embodiment is for making symmetrical, double opposed helical gears, or herringbone gears, shown in FIG. 6 as item 110 without a hub, and as item 115 with a hub. Other parts that can be produced with the tool set of FIGS. 3*a* through 3*f* are a split phase double opposed herringbone gear 120; opposed helices of differing number of teeth, but the same pitch angle, 125; an under-cut opposed double helical gear 130 having an upper gear of smaller diameter than the lower gear, and an overcut gear 135 having an upper gear of greater diameter than the lower gear; and asymmetrical double opposed helical gears having the same total angle of rotation, such as item 140.

Item 140, illustrated in FIG. 6, is a double helical gear with an upper gear portion 142 thrice as thick as the lower gear portion 144. During compression the relative advance of punch 61 in die 51 would also be thrice the relative advance of punch 21 within die 41 to maintain the neutral plane of the powder charge at, or near, parting plane 'P' of dies 51 and 41.

Combinations of the features of items 110, 115, 120, 125, 130, 135, and 140 are possible with the embodiment of FIGS. 3*a* through 3*f* provided that compression above and below plane 'P' is proportionate, and that the total angle of rotation of upper and lower dies is equal. Once a powder compact has been formed in the tool set, and ejected, it is sintered to yield a metal gear.

The present invention permits the fabrication of double helical gears having upper and lower gear portions, that are of substantially equal diameter or whose diameters vary by less than the sum of (a) the dedendum of the larger diameter gear portion, (b) the addenda of the smaller diameter gear portion, and (c) 2 millimeters.

The second embodiment of the invention, comprising the lower tool set parts illustrated in Sheet 3 of 3 of FIG. 1 combined with the upper tool set parts of sheet 2 of 3 of FIG. 1 is intended for making a wider range of parts than is possible with the preferred embodiment. Referring first to sheet 3 of 3 of FIG. 1, lower outer punch assembly 20 has been modified to include a rotational drive, and as modified is shown as rotationally driven lower outer punch assembly 220. Outer lower punch 21, radially extending flange 22, retaining ring 26 and rams 28 remain as before. Outer lower punch 21 is supported by driven support plate 223, itself mounted on inner ring 224. The remainder of driven lower outer punch assembly 220 comprises retaining ring 225, main base 227, ball bearings 95, thrust bearing 96, a motor 97 and drive, such as a timing chain 98. Main base 227 is provided with an internal radially extending shoulder, or shelf, 221, on which thrust bearing 96 rests, surmounted in turn by inner ring 224, which is provided with an outward and upwardly facing ball race 222 for accommodating ball bearings 95. Retaining ring 225 is provided with a bearing race 226 and is located on main base 227 above ball bearings 95. When thus located inner ring 224 is trapped between ball bearings 95 and thrust bearing 96 and is thus, ideally, incapable of vertical reciprocation independent of main base 227, but permitted to rotate about axis 4 as may be desired. Motor 97 may be mounted to main base 227. In the figures motor 97 is shown, for convenience of drawing, in the plane of the drawing. In practical use motor 97 would be mounted out of the plane of the drawing to interfere least with vertical reciprocation of lower die support assembly 30, and specifically, not to interfere with rams 39.

Driven support plate 223 may carry a gear tooth profile 228 for engagement with timing chain 98, itself driven by a pinion 99 mounted to motor 97. Thus operation of motor 97 will cause rotation of driven support plate 223, and, consequently, lower outer punch 21.

Although a motor 97 has been shown, driven lower outer punch assembly 220 could be caused to turn in a number of ways. For gears of low pitch angle, and thin or moderate thickness, auto-rotation of lower outer punch 21 within lower die 41 as rams 28 are driven vertically relative to rams 39 may be suitable. Alternatively a motor, as shown, or a cam system, or other known mechanical or electromechanical device could be used to achieve equivalent friction counteracting torque and motion.

A typical operating sequence for the second embodiment of the tool set of the present invention is illustrated in FIGS. 4*a* through 4*f*, in this case to produce a green powder compact of strongly differing helical pitch angles. FIGS. 4*a*, 4*b* and 4*c* correspond to the filling and pre-compaction steps of FIGS. 3*a*, 3*b* and 3*c*.

During compaction lower outer punch 21 is driven in the appropriate direction at the appropriate speed to achieve the same vertical rate of compaction as upper outer punch 61 relative to parting plane 'P'. If dies 51 and 41 are not of equal depth lower outer punch 21 can be caused to rotate at an appropriate rate to achieve proportionate compaction above and below parting plane 'P'. For example, if it is desired to produce a lower gear of thrice the thickness of the upper gear, yet with an equal, opposite pitch angle, and diameter, lower outer punch 21 may be rotated through twice the angle of rotation of dies 41 and 51, and advanced thrice as far within lower die 41 as upper outer punch 61 is advanced within upper die 51.

In this embodiment relative rotation of distal face 23 of lower outer punch 21 to the lower face of powder charge 'A' precludes the introduction of keyways between inner lower punch 11 and outer lower punch 21, and limits the location of drive slots or eccentric features in the compacted part in the region adjacent distal face 23. Similarly, distal face 23 must be of constant cross section at any given radius about axis 4, preferably flat, to avoid imposing excessive shear in the powder. In contrast to post-transfer relative rotation of upper and lower dies 51 and 41, rotation of lower outer punch 21 relative to the body of powder charge "A" is less likely to cause shearing of teeth at the interface of the upper and lower dies, or vice versa.

Similarly, asymmetric die withdrawal and ejection are possible. In a first phase of withdrawal the dies are withdrawn at the same rate of rotation until one die, for example die 51, clears workpiece 'B' at which time pins 44 also clear indexing holes 57, after which time in the second phase of withdrawal the other die, in the example die 41, can be rotated relative to punch 21 as desired to clear the remainder of workpiece 'B', and the part may be ejected. It is also possible that pins 44 do not clear indexing holes 57 at the start of the second withdrawal phase, in which case upper punch 61 would pertrude through die 51. Upper punch 61 and upper die 51 may be retracted longitudinally away from workpiece 'B' between the first and second phases of withdrawal.

In addition, driving lower outer punch 21 rotationally permits one to form, in addition to items 110, 115, 120, 125, 130, 135, and 140, with appropriately configured die and punch gear profiles, a combination helical gear and spur gear 145, and gears having the same or different pitches and different thicknesses, 150. In each of these cases any of the gears produced may have the same or different numbers of teeth, and the same or different diameter, and may be in or out of phase. A spur gear profile is produced in the special case in which one helix angle is set at zero degrees.

It appears that the apparatus of the present invention may be used to make a gear having two helical gears of the same hand but different helix angles, as illustrated in item 160, but in that instance upper and lower die carriers 40 and 50 would, in the general case, apparently require independent rotational motions (i.e. autorotational or driven) without any interlink mechanism such as pins 44 and indexing holes 57. That is, it appears that two part helical gears of the same hand but unequal pitch may be made by providing independent rotational motions to either (a) both dies and one outer punch or (b) one die and both outer punches. Drives for the independent rotational motions may be provided to reduce friction.

The two stage withdrawal may also be achieved, with independent rotation of upper and lower punches, in two completely separate phases. During the first phase upper die 51 is withdrawn along punch 61 until clear of workpiece 'B'. In the second phase lower die 41 is withdrawn along punch 21 to expose the part.

In the case of spur gear 145, with no rotation of dies and a rotating lower punch, the upper die is drawn upwardly away to expose the spur gear portion of workpiece 'B'. In the second phase of withdrawal lower punch 21 rotates as lower die 41 is withdrawn. In the case of asymmetric gears of the same hand, such as item 160, in which there is relative rotation between upper and lower dies 41 and 51, upper die 51 is withdrawn along punch 61, and subsequently lower die 41 is retracted along punch 21.

A press that involves three independent rotational motions, whether driven, or especially if auto-rotating, may be expected to be more difficult to produce than one requiring only two drives, and much more difficult than one requiring only a single rotational drive. In that regard while it appears possible to make item 160, the practical difficulties of constructing a suitable press, tool rig, (ie hold all tool elements) and tool set may militate against its actual production, particularly as the helical pitch angle increases. This same cautionary consideration might well be applied to a lesser extent to all gears more complex than the matched herringbone gears of the preferred embodiment. While the principles of the present invention appear to be theoretically applicable to any helical pitch angles, the practical range of the present invention is anticipated to be for angles less than 45 degrees, preferably in the range of 5 to 30 degrees. Helical gears having pitch angles in the range of 15 to 30 degrees are common. Gears with helical pitch angles in excess of 45 degrees are rare.

A third embodiment of a tool set, for producing double opposed helical gears, is shown in exploded form in FIG. 2. In this case, as will be described, neither of the upper or lower dies is mounted for rotation, whereas both upper and lower outer punches are rotatably mounted.

Lower outer punch assembly 220 is as described above. Lower die assembly 230 comprises a lower die 231, a die carrier or platen 232, a retainer 233, a filler wear plate 234, and rams 239, or equivalent. Lower die 231 is mounted in carrier 232, which is captured in place by retainer 233. Vertical reciprocation of lower die assembly 230 is controlled by driven rams 239 mounted to carrier 232. Notably, die 231 is unable to rotate relative to carrier 232 or rams 239, and is no longer provided with a drive mechanism or transfer pins. Die 231 has a negative helical gear profile 236 for mating with helical profile 29 of punch 21.

Upper outer die assembly 250 comprises upper die 251 mounted in upper die carrier 252, and locked in place with retaining ring 253. Rams 254 mounted to the upper face of upper outer punch assembly 250 control its vertical reciprocation.

Upper outer punch assembly 260 comprises an upper outer punch, 261, having a radially extending flange 262, a retaining ring 263, a support base 264, ball bearings 291, a thrust bearing 292, a capture ring 266, a disc 265 having depending capture ring 266, and platten 267 which may be mounted to rams, connecting rods, or other mechanical equivalents, not shown. A drive, shown as 297, has a timing chain 298 driven by a pinion 299. As before, drive 297, chain 298, and pinion 299 are shown for the convenience of drawing in the plane of sheet 2 of 2 of FIG. 2, but would, in practice, be disposed out of the plane of the page to avoid interference with the vertical reciprocation of other assemblies, such as upper die assembly 250, and in particular, rams 254. Upper die 251 has a negative helical gear profile for mating with a helical gear profile 268 of punch 261.

As before, although motor 297 and timing chain 298 are shown for rotationally driving lower outer punch 21 and upper outer punch 261, auto-rotation may be adequate in some circumstances, and alternative mechanically or electromechanically equivalent variations could be used.

This third embodiment of the invention can be used to form herringbone gear workpieces. The same restrictions to the use of splines, keyways, and eccentric features noted above apply to the third embodiment since both upper and lower punches may experience rotation with respect to the powder charge during compaction.

The steps of filling and transfer are much as before, as shown in FIGS. 5*a*, 5*b* and 5*c*. During the step of compaction experienced between FIG. 5*c* and 5*d*, it is, as usual, desirable to discourage displacement of powder across parting plane ‘P’, by causing upper, lower, and transfer punches 21, 261, and 11 respectively, to advance simultaneously and proportionately relative to parting plane ‘P’. In the usual case in which the volume of cavity 204 is reduced, more or less, 50% in volume, each of punches 21, 261, and 11 will advance to half its former distance from plane ‘P’. The rates and relative displacement of the punches will be proportional to the relative thicknesses of the upper and lower helical gear portions of eventual workpiece ‘B’. As before, the motion is relative motion, since parting plane ‘P’ may move relative to the stationary press.

For example, if the desired final thickness of the lower helical gear ($T_L$) is 2.0 cm and its diameter ($D_L$) is 1.5 cm, and the final desired thickness of the upper helical gear ($T_H$) is 1.0 cm and its diameter ($D_H$) is 2.5 cm, then the transfer step will end with the opposing distal face 270 of upper outer punch 261 6 cm apart from distal face 23 of lower outer punch 21, with face 270 2 cm above plane ‘P’, and face 23 4 cm below plane ‘P’.

During compaction the relative vertical advance of upper outer punch 261 must be half that of lower outer punch 21, and must occur at half the rate. For the gear profiles chosen this proportionate advance will dictate the angle and rate of rotation necessary for the upper and lower outer punches. For example, if the chosen lower helix angle is 15° and upper chosen helix angle is 45° then the upper outer punch 261 must rotate (1/2)(1.5/2.5)(TAN 45°/TAN 15°) times as far, and as fast, as lower outer punch 21.

During the withdrawal step, since the dies do not rotate, workpiece ‘B’ must rotate as dies 231 and 251 separate or the teeth of workpiece ‘B’ will be torn off. For herringbone gears, upper die 251 and lower die 231 will clear the respective upper and lower portions of workpiece ‘B’ more or less simultaneously. For an asymmetric gear in which $(T_H/T_L)\cdot(D_L/D_H)\cdot(\mathrm{TAN}\ \ominus_H/\mathrm{TAN}\ \ominus_L)\approx 1$ one die will clear before the other. In that case one die may stop moving, or both dies may continue moving until the second die also clears workpiece ‘B’.

The withdrawal step may then be said to be sub-divided into a first gear clearing portion, in which punches 261 and 21 rotate through an equal angle relative to dies 231 and 251 to disengage a first die from workpiece ‘B’, and a second gear clearing portion in which workpiece ‘B’ and at least one of punches 261 or 21 rotate relative to the die, 231 or 251, which continues to engage workpiece ‘B’ until that die also clears workpiece ‘B’.

The third embodiment of the invention, can be used to make herringbone gears and opposite handed gears. Examples of the gears which may be produced with the third embodiment include items 110, 115, 120, 125, and 130. In the event that the upper and lower punches are permitted to rotate independently of each other one can also form items 135 and 140. Item 145 can be produced with non-rotating dies and a single rotating, lower punch using a two stage withdrawal in which the upper assemblies of the press are withdrawn first to expose the spur gear.

Thus one embodiment of the present invention includes a tool set for making double helical gear green powder compacts, that tool set comprising a lower punch 21 having a first helical gear profile 29 and a lower die 41 having a mating negative helical profile 45 for helically sliding engagement with punch 21, an upper, opposed punch 261 having a second helical profile 268 from punch 21, an upper die 251 having a mating negative helical profile 268 for helically sliding engagement with punch 261, punch 261 disposed in opposition to punch 21 and dies 41 and 251 movable to abut at a parting plane 'P'.

The present invention may further include, as installed in a multiply-acting press having an axis 4 of reciprocation, a core rod 6 and a transfer punch 11, punch 21 being concentric with transfer punch 11 and having a distal end face 23 for contacting a charge of powder 'A', upper punch 261 concentric with axis 4 and having a distal end face 270 for contacting that charge of powder 'A', the tool set movable to a filling position for receiving that charge of powder; a closed position in which dies 41 and 251 define the periphery of a cavity 104 having an upper portion bounded by die 251 and a lower portion bounded by die 41; a transfer position; a compaction position; at least one withdrawal position; and an ejection position.

Although a number of embodiments have been described herein for practising the present invention, those skilled in the art will recognize that the principles of the invention are not limited to specific embodiments herein but apply also to equivalents thereof.

I claim:

1. A tool set for compacting a component from a powdered metal charge, said tool set comprising:

a pair of dies each having a respective chamber to define at least a portion of said component, a pair of punches each associated with a respective one of said dies, said punches being moveable relative to respective ones of said dies to vary the capacity of respective ones of said chambers, said dies being movable relative to one another between an open position in which said dies are separated and a closed position in which said dies co-operate to define a closed cavity;

said punches being movable when said dies are in said closed position toward one another along an axis to compress said charge and produce said component, said punches being maintainable in a fixed spaced relationship from each other to support said component during movement of each of said dies from said closed position to said withdrawal position, and one of said dies being rotatable relative to its respective punch during movement from said closed position to said withdrawal position.

2. The tool set of claim 1 wherein said rotatable die has an inclined profile for mating with an inclined profile of its respective punch whereby relative movement between said rotatable die and its respective punch is constrained by said inclined profile.

3. The tool set of claim 1 wherein said rotatable die and its respective punch have mating helical profiles whereby movement of said die from said closed position to said withdrawal position causes said die to rotate about its respective punch.

4. The tool set of claim 1 wherein said dies are conjointly rotatable relative to said punches while being moved from said closed position to said withdrawal position.

5. The tool set of claim 1 wherein, in said open position, one of said punches is positioned relative to its respective die in a filling position such that its respective chamber has the capacity to receive said charge of powder therein.

6. The tool set of claim 5 wherein said one punch is movable in said closed position along said axis to a transfer position in which said respective chamber has a reduced volume, movement of said punch to said transfer position thereby transferring powder to the other of said chambers.

7. The tool set of claim 1 wherein said punches are engaged within said respective dies in said open position and in said closed position.

8. A tool set for forming a powder compact, said tool set comprising:

a pair of opposed die and punch sets each having a die and a punch co-operating with said die to define respective chambers;

said dies being movable relative to one another from an open position in which said dies are separated, to a closed position in which said dies abut with said chambers in closed communication to form a closed mold cavity;

said punches being movable in said closed position toward one another to compress said powder to form the compact;

said dies being separable from said closed position by movement along said axis to expose said compact, said dies rotating conjointly as said compact is exposed.

9. A tool set for forming a powder compact, said tool set comprising:

a pair of opposed die and punch sets each having a die and punch co-operating with said die to define respective chambers;

said dies being movable relative to one another from an open position in which said dies are separated to permit a charge of powder to be received in one of said chambers, to a closed position in which said sets abut with said chambers in closed communication to form a closed mold cavity; and one of said sets including a punch movable in said closed position relative to said die along an axis to a transfer position in which said one chamber has a reduced volume and powder is transferred to the other of said chambers, said dies being separable from said closed position by relative movement along said axis with at least one of said dies rotating relative to its respective punch upon such movement along said axis to expose said compact.

10. A tool set as claimed in claim 9 wherein in said open position each of said dies remains in engagement with its respective punch.

11. The tool set of claim 9 wherein both of said dies are rotatable about the axis during translation along the axis relative to one of said punches.

12. The tool set of claim 9 wherein said dies are conjointly rotatable about said axis.

13. The tool set of claim 9 wherein said rotatable die has an inclined profile for mating with an inclined profile of its respective punch whereby relative movement between said rotation die and its respective punch is constrained by said inclined profile.

14. The tool set of claim 13 wherein said inclined profile is an helical profile.

15. The tool set of claim 9 wherein:

in said closed position said punches are moveable toward one another to compress said charge, thereby forming said compact; and said punches are maintainable in a fixed spaced apart relationship during withdrawal of said dies to expose said compact.

16. The tool set of claim 15 wherein said dies are conjointly rotatable about said axis.

17. The tool set of claim 9 wherein said one die and punch set includes a second punch nested within its respective die.

18. The tool set of claim 9 wherein one of said punches is rotatable about said axis relative to the other of said punches.

19. A method of forming a powder compact in a tool set having a pair of opposed die and punch sets each having a die and a punch co-operating with said die to define respective chambers, said method comprising the steps of:

a) establishing said tool set in a closed position, with said chambers in closed communication to form a closed cavity containing a charge of powder;

b) advancing said punches toward each other along an axis to compress the charge of powder and thereby to form the compact; and c) maintaining said punches at a fixed spacing from each other while moving each of said dies along the axis to separate the dies and expose the compact;

d) rotating at least one of said dies about the axis as it moves along said axis; and e) ejecting the compact from said tool set.

20. The method of claim 19 wherein said dies are rotated conjointly while separating said dies.

21. The method of claim 19 wherein at least one die and one punch mate along a profile inclined relative to an axis of reciprocation of said tool set and rotation is induced by interengagement of said die and punch during relative movement along said axis.

22. The method of claim 19 wherein said die and punch mate along a helical profile and rotation is induced by interengagement of said die and punch during relative movement along said axis.

23. The method of claim 22 wherein step (c) includes rotating one of said punches relative to the other of said punches about the axis.

24. The method of claim 19 wherein step (a) includes the steps of:

a) (i) commencing with said dies separated and with said punches in engagement with said dies; and a) (ii) moving said dies to said closed position while maintaining said respective punches in engagement with said dies.

25. The method of claim 24 including the further steps of moving said one punch along said axis in said closed position to transfer powder from one chamber to the other chamber.

26. The method of claim 25 wherein said dies are maintained in engagement with said punches throughout.

27. A method of forming a powder compact in a tool set having a pair of opposed die and punch sets each having a die and a punch co-operating with said die to define respective chambers, said method comprising the steps of:

a) commencing with said dies separated;

b) establishing one of said punches within its respective die in a filling position for receiving a charge of powder in said respective chamber;

c) moving said dies to a closed position in which said dies abut, with said chambers in closed communication to form a closed cavity containing the charge of powder;

d) advancing said punches toward each other along an axis to compress the charge of powder and thereby to form a powder compact;

e) separating said dies by moving each of said dies in opposite directions along said axis to expose the compact while rotating at least one of said dies about the axis; and f) ejecting the compact from said tool set.

28. The method of claim 27 wherein step (e) includes rotating said dies conjointly while separating said dies.

29. The method of claim 29 wherein step (e) includes withdrawing said die along an helical profile.

30. The method of claim 27 wherein step (c) includes, in said closed position, moving one of said punches relative to its respective die to transfer powder from one chamber to the other chamber.

31. The method of claim 27 wherein said method includes maintaining said dies in engagement with its respective punch throughout steps (a), (b) and (c).

* * * * *